(12) United States Patent
Li et al.

(10) Patent No.: US 11,924,876 B2
(45) Date of Patent: Mar. 5, 2024

(54) METHOD AND APPARATUS OF HANDLING PARTIAL SENSING AND DISCONTINUOUS RECEPTION FOR SIDELINK COMMUNICATION IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 3 days.

(21) Appl. No.: 17/573,072

(22) Filed: Jan. 11, 2022

(65) Prior Publication Data

US 2022/0232626 A1 Jul. 21, 2022

Related U.S. Application Data

(60) Provisional application No. 63/137,083, filed on Jan. 13, 2021.

(51) Int. Cl.
*H04W 74/08* (2009.01)
*H04W 72/56* (2023.01)

(52) U.S. Cl.
CPC ....... *H04W 74/0808* (2013.01); *H04W 72/56* (2023.01)

(58) Field of Classification Search
CPC . H04W 72/02; H04W 72/56; H04W 74/0808; H04W 76/14; H04W 76/28
See application file for complete search history.

(56) References Cited

U.S. PATENT DOCUMENTS

2019/0306835 A1\* 10/2019 Hoang ................. H04W 72/53
2021/0144680 A1\* 5/2021 Chervyakov ......... H04W 72/20
(Continued)

FOREIGN PATENT DOCUMENTS

EP 3634061 A1 4/2020
EP 3672133 A1 6/2020
(Continued)

OTHER PUBLICATIONS

Intel Corporation: "Sidelink Resource Allocation Mode-2 Design for NR V2X Communication", 3GPP Draft; R1-1906796; retrieved from the Internet on May 13, 2019: URL:http://www.3gpp.org/ftp/Meetings%5F3GPP%5FSYNC/RAN1/Docs/R1%2D1906796%2Ezip; 18 pages.

(Continued)

*Primary Examiner* — Kashif Siddiqui
(74) *Attorney, Agent, or Firm* — Skaar Ulbrich Macari, P.A.

(57) ABSTRACT

Methods and apparatuses for handling partial sensing and discontinuous reception for sidelink communication to reduce potential latency due to additional sensing and to improve resource utilization efficiency. Various embodiments can comprise a first device performing sidelink communication to at least a second device, or a second device in a sidelink resource pool, and triggering to perform resource selection for a sidelink data at a timing, wherein the first device (already) receives or monitors sidelink control information for a (contiguous) time duration before the timing. The first device can perform sensing for a contiguous sensing duration after the timing, determine or select a first sidelink resource from a set of sidelink resources, and perform a first sidelink transmission on the first sidelink resource for transmitting the sidelink data to the second device.

20 Claims, 16 Drawing Sheets

(56) References Cited

U.S. PATENT DOCUMENTS

2022/0061095 A1* 2/2022 Xue .................. H04W 72/02
2023/0038246 A1* 2/2023 Dong .................. H04W 4/70

FOREIGN PATENT DOCUMENTS

| EP | 3780891 A1 | 2/2021 |
| EP | 3855860 A1 | 7/2021 |
| EP | 3855862 A1 | 7/2021 |
| WO | 2021147028 A1 | 7/2021 |

OTHER PUBLICATIONS

Extended European Search Report to the counterpart European Patent Application rendered by the European Patent Office dated May 16, 2022, 8 pages.

* cited by examiner

METHOD AND APPARATUS OF HANDLING PARTIAL SENSING AND DISCONTINUOUS RECEPTION FOR SIDELINK COMMUNICATION IN A WIRELESS COMMUNICATION SYSTEM

CROSS-REFERENCE TO RELATED APPLICATIONS

The present application claims priority to and the benefit of U.S. Provisional Patent Application Ser. No. 63/137,083, filed Jan. 13, 2021, which is fully incorporated herein by reference.

FIELD

This disclosure generally relates to wireless communication networks and, more particularly, to a method and apparatus for handling partial sensing and discontinuous reception for sidelink communication.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses are provided for handling partial sensing and discontinuous reception for sidelink communication to reduce potential latency due to additional sensing and to improve resource utilization efficiency.

In various embodiments, a first device performs sidelink communication to at least a second device in a sidelink resource pool, where the first device triggers to perform resource selection for a sidelink data at a timing. The first device (already) receives/monitors sidelink control information for a (contiguous) time duration before the timing. The first device performs sensing for a contiguous sensing duration after the timing, wherein a time length of the contiguous sensing duration is determined/derived based on a time length of the (contiguous) time duration. The first device determines/selects a first sidelink resource from a set of sidelink resources, with the set of sidelink resources derived/determined based on at least a sensing result of the sensing after the timing. The first device performs a first sidelink transmission on the first sidelink resource for transmitting the sidelink data to the second device.

In various embodiments, a first device performs sidelink communication to at least a second device in a sidelink resource pool, where the first device triggers to perform resource selection for a sidelink data at a timing. The first device receives/monitors sidelink control information for a (contiguous) time duration before the timing. The first device performs sensing for a contiguous sensing duration after the timing. The first device determines/selects a first sidelink resource from a set of sidelink resources. The set of sidelink resources is derived/determined based on at least a sensing result of the sensing after the timing and receiving/monitoring result within the (contiguous) time duration. The first device performs a first sidelink transmission on the first sidelink resource for transmitting the sidelink data to the second device.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 36.213 V16.4.0 (2020 December), "3GPP TSG RAN; E-UTRA Physical layer procedures (Release 16)"; [2] 3GPP TS 38.214 V16.4.0 (2020 December), "3GPP TSG RAN; NR Physical layer procedures for data (Release 16)"; [3] 3GPP TS 38.213 V16.4.0 (2020 December), "3GPP TSG RAN; NR Physical layer procedures for control (Release 16)"; [4] 3GPP TS 38.212 V16.4.0 (2020 December), "3GPP TSG RAN; NR Multiplexing and channel coding (Release 16)"; [5] 3GPP TS 38.321 V16.3.0 (2020 December), "3GPP TSG RAN; NR Medium Access Control (MAC) protocol specification (Release 16)"; [6] RP-202846, "WID revision: NR sidelink enhancement"; [7] Draft Report of 3GPP TSG RAN WG1 #103-e v0.2.0 (Online meeting, 26 Oct.-13 Nov. 2020); [8] R2-2100001, "Report of 3GPP TSG RAN2 #112-e meeting, Online"; [9] R1-2007615, "Sidelink resource allocation to reduce power consumption", Huawei, HiSilicon; [10] R1-2007688, "Resource allocation for sidelink power saving", vivo; [11] R1-2008189, "On Resource Allocation for Power Saving", Samsung; [12] R1-2009072, "Resource allocation mechanisms for power saving", Ericsson; and [13] R1-2009272, "Power Savings for Sidelink", Qualcomm Incorporated. The standards and documents listed above are hereby expressly and fully incorporated herein by reference in their entirety.

Figure 1:
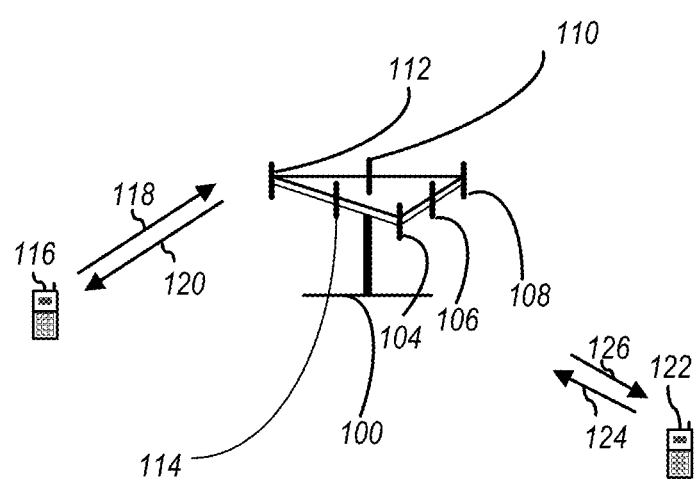
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
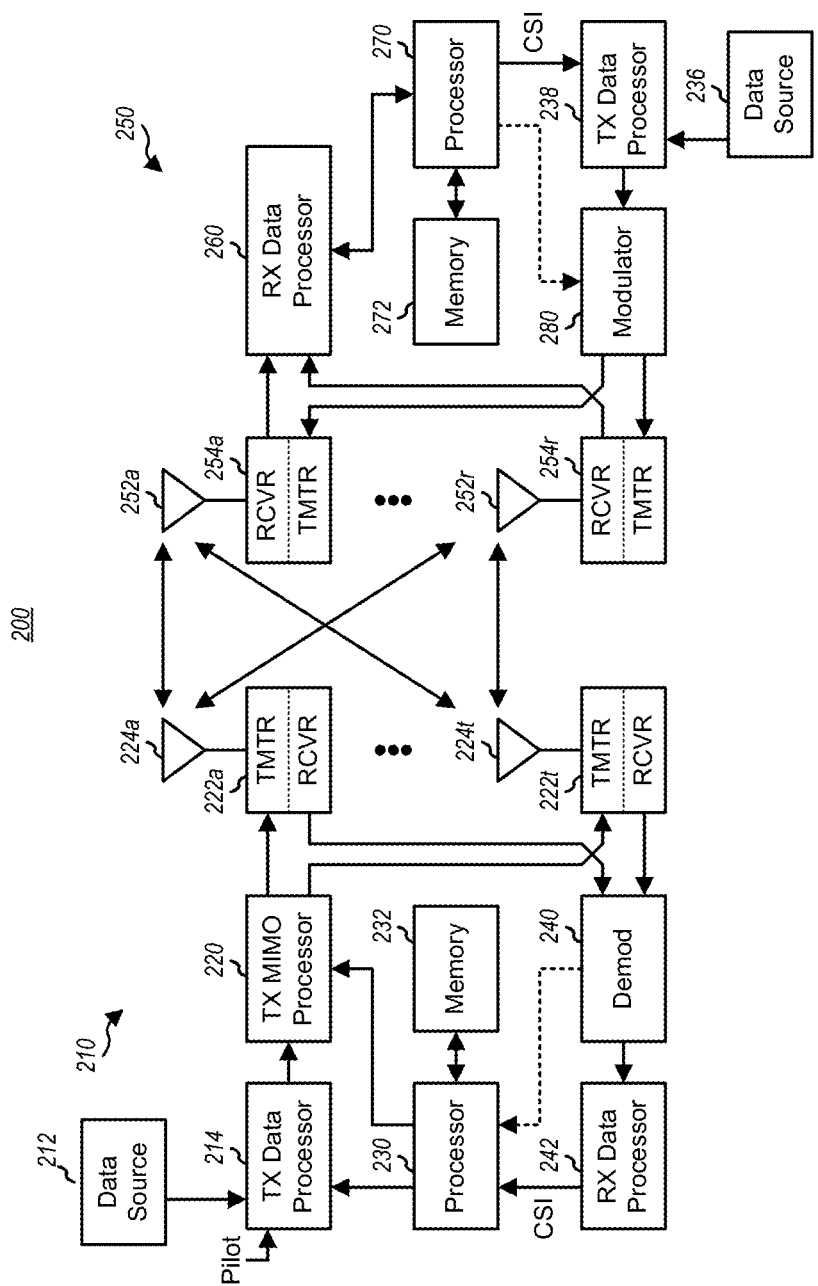
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
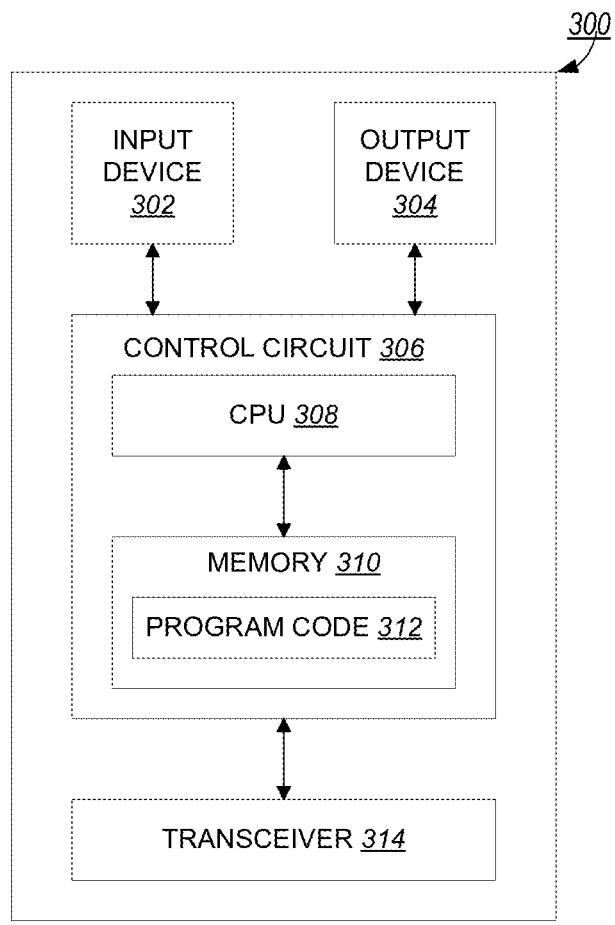
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
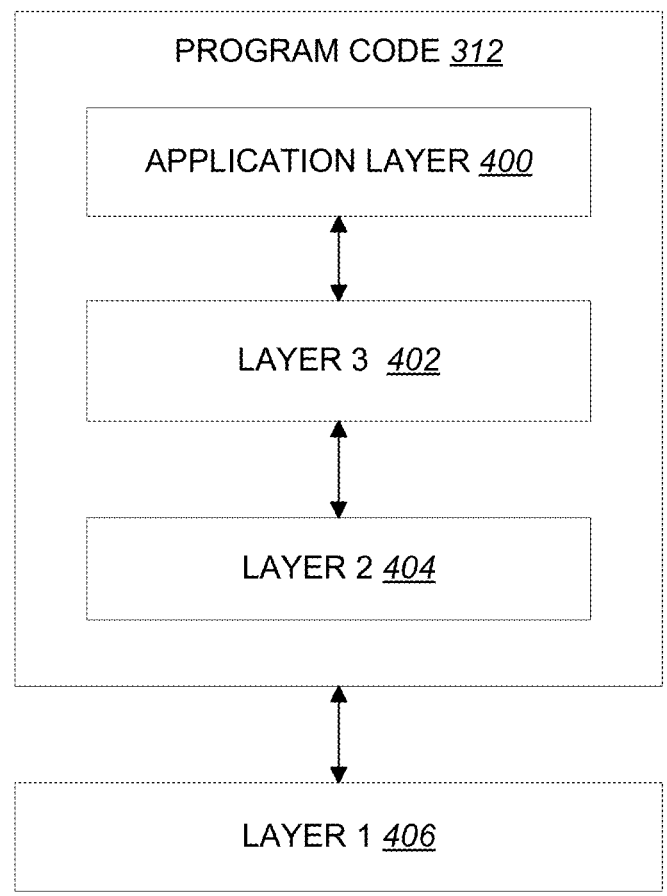
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention may be combined logically, reasonably, and properly to form a specific method.

Any sentence, paragraph, (sub-)bullet, point, action, or claim described in each of the following invention may be implemented independently and separately to form a specific method. Dependency, e.g., "based on", "more specifically", etc., in the following invention is just one possible embodiment which would not restrict the specific method.

TS 36.213[1] specifies physical sidelink shared channel related procedures in LTE. For acquiring sidelink resources, it specifies (periodic-based) partial sensing for sidelink transmission mode 4.

QUOTATION [1] START 14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Clause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Clause 14.1.1.4B.

In sidelink transmission mode 3, when requested by higher layers in subframe n for a carrier, the UE shall determine the set of resources to be reported to higher layers in sensing measurement according to the steps described in this Clause. Parameters $L_{subCH}$, $P_{rsvp\_TX}$, and $prio_{TX}$ are all provided by higher layers (described in [11]). $C_{resel}$ is determined by $C_{resel}=10*SL\_RESOURCE\_RESELECTION\_COUNTER$, where SL_RESOURCE_RESELECTION_COUNTER is provided by higher layers [11].

[ . . . ]

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall determine by its implementation a set of subframes which consists of at least Y subframes within the time interval [n+T$_1$,n+T$_2$] where selections of T$_1$ and T$_2$ are up to UE implementations under T$_1$≤4 and T$_{2\ min}$(prio$_{TX}$)≤ T$_2$≤100, if T$_{2\ min}$(prio$_{TX}$) is provided by higher layers for prio$_{TX}$, otherwise 20≤T$_2$≤100. UE selection of T$_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=(a−1)*8+b.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Clause 14.2.1.

PSSCH-RSRP measurement according to the received SCI format 1 is higher than $Th_{prior_{TX},prio_{TX}}$.

the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}$ for q=1, 2, . . . , Q and j=0, 1, . . . , $C_{resel}$−1. Here, $$Q = \frac{1}{P_{rsvp\_RX}}$$

if $P_{rsvp\_RX}$<1 and y'−m≤$P_{step} \times P_{rsvp\_RX}$+$P_{step}$, where $t_{y'}^{SL}$ is the last subframe of the Y subframes, and Q=1 otherwise.

6) If the number of candidate single-subframe resources remaining in the set $S_A$ is smaller than $0.2 \cdot M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

QUOTATION [1] END

In TS 38.214[2], it specifies Physical sidelink shared channel related procedure in NR. For acquiring sidelink resources, it specifies sidelink resource allocation mode 1 and sidelink resource allocation mode 2.

QUOTATION [2] START

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$, the slot index is relative to slot #0 of the radio frame corresponding to SFN 0 of the serving cell or DFN 0, the set includes all the slots except the following slots, $N_{S\_SSB}$ slots in which S-SS/PSBCH block (S-SSB) is configured, $N_{nonSL}$ slots in each of which at least one of Y-th, (Y+1)-th, . . . , (Y+X−1)-th OFDM symbols are not semi-statically configured as UL as per the higher layer parameter tdd-UL-DL-ConfigurationCommon-r16 of the serving cell if provided or sl-TDD-Configuration-r16 if provided or sl-TDD-Config-r16 of the received PSBCH if provided, where Y and X are set by the higher layer parameters sl-StartSymbol and sl-LengthSymbols, respectively.

The reserved slots which are determined by the following steps.

1) the remaining slots excluding $N_{S\_SSB}$ slots and $N_{nonsL}$ slots from the set of all the slots are denoted by $$(l_0, l_1, \ldots, l_{(10240 \times 2^\mu - N_{S_{SSB}} - N_{nonSL} - 1)})$$

arranged in increasing order of slot index.

2) a slot $l_r$ ($0 \leq r < 10240 \times 2^\mu - N_{S_{SSB}} - N_{nonSL}$) belongs to the reserved slot if $$r = \left\lfloor \frac{m \cdot (10240 \times 2^\mu - N_{S_{SSB}} - N_{nonSL})}{N_{reserved}} \right\rfloor,$$

here m=0, 1, ..., $N_{reserved}$-1 and $N_{reserved}$= (10240×2$^\mu$-$N_{S_{SSB}}$-$N_{nonSL}$)mod $L_{bitmap}$ where $L_{bitmap}$ denotes the length of bitmap configured by higher layers.

The slots in the set are arranged in increasing order of slot index.

The UE determines the set of slots assigned to a sidelink resource pool as follows:

a bitmap ($b_0, b_1, \ldots, b_{L_{bitmap}-1}$) associated with the resource pool is used where $L_{bitmap}$ the length of the bitmap is configured by higher layers.

a slot $t_k^{SL}$ ($0 \leq k < 10240 \times 2^\mu - N_{S_{SSB}} - N_{nonSL} - N_{reserved}$) belongs to the set if $b_{k'}=1$ where k'=k mod $L_{bitmap}$.

The slots in the set are re-indexed such that the subscripts i of the remaining slots $t'^{SL}_i$ are successive {0, 1, ..., T'$_{max}$-1} where T'$_{max}$ is the number of the slots remaining in the set.

The UE determines the set of resource blocks assigned to a sidelink resource pool as follows:

The resource block pool consists of $N_{PRB}$ PRBs.

The sub-channel m for m=0, 1, ..., numSubchannel-1 consists of a set of $n_{subCHsize}$ contiguous resource blocks with the physical resource block number $n_{PRB}=n_{subCHRBstart}+m \cdot n_{subCHsize}+j$ for j=0, 1, ..., $n_{subCHsize}$-1, where $n_{subCHRBstart}$ and $n_{subCHsize}$ are given by higher layer parameters sl-StartRB-Subchannel and sl-SubchannelSize, respectively A UE is not expected to use the last $N_{PRB}$ mod $n_{subCHsize}$ PRBs in the resource pool.

8.1 UE Procedure for Transmitting the Physical Sidelink Shared Channel

Each PSSCH transmission is associated with an PSCCH transmission.

That PSCCH transmission carries the 1$^{st}$ stage of the SCI associated with the PSSCH transmission; the 2$^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;
The number of layers ($\upsilon$) is determined according to the 'Number of DMRS port' field in the SCI;
The set of consecutive symbols within the slot for transmission of the PSSCH is determined according to clause 8.1.2.1;

The set of contiguous resource blocks for transmission of the PSSCH is determined according to clause 8.1.2.2;

Transform precoding is not supported for PSSCH transmission.

Only wideband precoding is supported for PSSCH transmission.

The DM-RS antenna ports $\{\tilde{p}_e \ldots, \tilde{p}_{e-1}\}$ in Clause 8.4.1.1.1 of [4, TS38.211] are determined according to the ordering of DM-RS port(s) given by Tables 8.3.1.1-1 in Clause 8.3.1.1 of [5, TS 38.212].

The UE shall set the contents of the SCI format 2-A as follows:

the UE shall set value of the 'HARQ process number' field as indicated by higher layers.
the UE shall set value of the 'NDI' field as indicated by higher layers.
the UE shall set value of the 'Source ID' field as indicated by higher layers.
the UE shall set value of the 'Destination ID' field as indicated by higher layers.
the UE shall set value of the 'HARQ feedback enabled/disabled indicator' field as indicated by higher layers.
the UE shall set value of the 'Cast type indicator' field as indicated by higher layers.
the UE shall set value of the 'CSI request' field as indicated by higher layers.

The UE shall set the contents of the SCI formats 2-B as follows:

the UE shall set value of the 'HARQ process number' field as indicated by higher layers.
the UE shall set value of the 'NDI' field as indicated by higher layers.
the UE shall set value of the 'Source ID' field as indicated by higher layers.
the UE shall set value of the 'Destination ID' field as indicated by higher layers.
the UE shall set value of the 'HARQ feedback enabled/disabled indicator' field as indicated by higher layers.
the UE shall set value of the 'Zone ID' field as indicated by higher layers.
the UE shall set the 'Communication range requirement' field as indicated by higher layers.

8.1.1 Transmission Schemes

Only one transmission scheme is defined for the PSSCH and is used for all PSSCH transmissions. PSSCH transmission is performed with up to two antenna ports, with antenna ports 1000-1001 as defined in clause 8.2.4 of [4, TS 38.211].

8.1.2 Resource Allocation

In sidelink resource allocation mode 1:
for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.3 of [6, TS 38.213].

8.1.2.1 Resource Allocation in Time Domain

The UE shall transmit the PSSCH in the same slot as the associated PSCCH.
The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters startSLsymbols and lengthSLsymbols, where startSLsymbols is the symbol index of the first symbol of lengthSLsymbols consecutive symbols configured for sidelink. Within the slot, PSSCH resource allocation starts at symbol startSLsymbols+1.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

. . .

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.
[ . . . ]

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r'_0, r'_1, r'_2, \ldots)$ which may be subject to pre-emption.

it is up to UE implementation to determine the subset of resources as requested by higher layers before or after the slot $r''_i - T_3$, where $r''_i$ is the slot with the smallest slot index among $(r_0, r_1, r_2, \ldots)$ and $(r'_0, r'_1, r'_2, \ldots)$, and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

The following higher layer parameters affect this procedure:

sl-SelectionWindowList: internal parameter $T_{2\,min}$ is set to the corresponding value from higher layer parameter sl-SelectionWindowList for the given value of $prio_{TX}$.

sl-ThresPSSCH-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$.

sl-RS-ForSensing selects if the UE uses the PSSCH-RSRP or PSCCH-RSRP measurement, as defined in clause 8.4.2.1.

sl-ResourceReservePeriodList sl-Sensing Window: internal parameter $T_0$ is defined as the number of slots corresponding to sl-SensingWindow msec sl-TxPercentageList: internal parameter X for a given $prio_{TX}$ is defined as sl-TxPercentageList ($prio_{TX}$) converted from percentage to ratio sl-PreemptionEnable: if sl-PreemptionEnable is provided, and if it is not equal to 'enabled', internal parameter $prio_{pre}$ is set to the higher layer provided parameter sl-PreemptionEnable The resource reservation interval, $P_{rsvp\_TX}$, if provided, is converted from units of msec to units of logical slots, resulting in $P'_{rsvp\_TX}$ according to clause 8.1.7.

Notation:

$(t_0^{SL}, t_1^{SL}, t_2^{SL}, \ldots)$ denotes the set of slots which can belong to a sidelink resource pool and is defined in Clause 8.

$(t'_0{}^{SL}, t'_1{}^{SL}, t'_2{}^{SL}, \ldots)$ denotes the set of slots which belongs to the sidelink resource pool and is defined in Clause 8.

The following steps are used:

1) A candidate single-slot resource for transmission $R_{x,y}$ is defined as a set of $L_{subCH}$ contiguous sub-channels with sub channel x+j in slot $t'_y{}^{SL}$ where $j=0, \ldots, L_{subCH}-1$. The UE shall assume that any set of $L_{subCH}$ contiguous sub-channels included in the corresponding resource pool within the time interval $[n+T_1, n+T_2]$ correspond to one candidate single-slot resource, where selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;

if $T_{2\,min}$ is shorter than the remaining packet delay budget (in slots) then $T_2$ is up to UE implementation subject to $T_{2\,min} \leq T_2 \leq$ remaining packet budget (in slots); otherwise $T_2$ is set to the remaining packet delay budget (in slots).

The total number of candidate single-slot resources is denoted by $M_{total}$.

2) The sensing window is defined by the range of slots $[n-T_0, n-T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter Th($p_i$, $p_j$) is set to the corresponding value of RSRP threshold indicated by the i-th field in sl-ThresPSSCH-RSRP-List, where i=$p_i$+($p_j$−1) *8.
4) The set $S_A$ is initialized to the set of all the candidate single-slot resources.
5) The UE shall exclude any candidate single-slot resource $R_{x,y}$ from the set $S_A$ if it meets all the following conditions:
   the UE has not monitored slot $t'^{SL}_m$ in Step 2.
   for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.
6) The UE shall exclude any candidate single-slot resource $R_{x,y}$ from the set $S_A$ if it meets all the following conditions:
   a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];
   b) the RSRP measurement performed, according to clause 8.4.2.1 for the received SCI format 1-A, is higher than Th($prio_{RX}$, $prio_{TX}$);
   c) the SCI format received in slot $t^{SL}_m$ or the same SCI format which, if and only if the 'Resource reservation period' field is present in the received SCI format 1-A, is assumed to be received in slot(s) $t^{SL}_{m+q \times P'_{rsvp\_RX}}$ determines according to clause 8.1.5 the set of resource blocks and slots which overlaps with $R_{x,y+j \times P'_{rsvp\_TX}}$ for q=1, 2, . . . , Q and j=0, 1, . . . , $C_{resel}$−1. Here, $P'_{rsvp\_RX}$ is $P_{rsvp\_RX}$ converted to units of logical slots according to clause 8.1.7, $$Q = \left\lceil \frac{T_{scal}}{P_{rsvp\_RX}} \right\rceil$$

if $P_{rsvp\_RX} < T_{scal}$ and n'−m≤$P'_{rsvp\_RX}$, where $t^{SL}_{n'}$=n if slot n belongs to the set ($t^{SL}_0$, $t^{SL}_1$, . . . $t^{SL}_{T_{max}}$) otherwise slot $t^{SL}_n$ is the first slot after slot n belonging to the set ($t^{SL}_0$, $t^{SL}_1$, . . . , $t^{SL}_{T_{max}}$); otherwise Q=1. $T_{scal}$ is set to selection window size $T_2$ converted to units of msec.

7) If the number of candidate single-slot resources remaining in the set $S_A$ is smaller than $X \cdot M_{total}$, then Th($p_i$, $p_j$) is increased by 3 dB for each priority value Th($p_i$, $p_j$)and the procedure continues with step 4.

The UE shall report set $S_A$ to higher layers.

If a resource $r_i$ from the set ($r_0$, $r_1$, $r_2$, . . . ) is not a member of $S_A$, then the UE shall report re-evaluation of the resource $r_i$ to higher layers.

If a resource $r'_i$ from the set ($r'_0$, $r'_1$, $r'_2$, . . . ) is not a member of $S_A$ due to exclusion in step 6 above by comparison with the RSRP measurement for the received SCI format 1-A with an associated priority $prio_{RX}$, and satisfy one of the following conditions, then the UE shall report pre-emption of the resource $r'_i$ to higher layers.
   sl-PreemptionEnable is provided and is equal to 'enabled' and $prio_{TX} > prio_{RX}$
   sl-PreemptionEnable is provided and is not equal to 'enabled', and $prio_{RX} < prio_{pre}$ and $prio_{TX} > prio_{RX}$

TABLE 8.1.4-1

| $T^{SL}_{proc,0}$ depending on sub-carrier spacing | |
|---|---|
| $\mu_{SL}$ | $T^{SL}_{proc,0}$ [slots] |
| 0 | 1 |
| 1 | 1 |
| 2 | 2 |
| 3 | 4 |

TABLE 8.1.4-2

| $T^{SL}_{proc,1}$ depending on sub-carrier spacing | |
|---|---|
| $\mu_{SL}$ | $T^{SL}_{proc,1}$ [slots] |
| 0 | 3 |
| 1 | 5 |
| 2 | 9 |
| 3 | 17 |

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl_MaxNumPerReserve is 3, in a form of time RIV (TRIV) field which is determined as follows:

```
if N = 1
  TRIV = 0
elseif N = 2
  TRIV = t₁
else
  if (t₂ − t₁ − 1) ≤ 15
    TRIV = 30(t₂ − t₁ − 1) + t₁ + 31
  else
    TRIV = 30(31 − t₂ + t₁) + 62 − t₁
  end if
end if
``` where the first resource is in the slot where SCI format 1-A was received, and $t_i$ denotes i-th resource time offset in logical slots of a resource pool with respect to the first resource where for N=2, 1≤$t_1$≤31; and for N=3, 1≤$t_1$≤30, $t_1 < t_2 \leq 31$.

The starting sub-channel $n^{start}_{subCH,0}$ of the first resource is determined according to clause 8.1.2.2. The number of contiguously allocated sub-channels for each of the N resources $L_{subCH} \geq 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 3 then $$FRIV = n^{start}_{subCH,1} + \Sigma_{i=1}^{L_{subCH}-1}(N^{SL}_{subchannel}+1-i)$$

If sl-MaxNumPerReserve is 3 then $$FRIV = n^{start}_{subCH,1} + n^{start}_{subCH,2} \cdot (N^{SL}_{subchannel}+1-L_{subCH}) + \Sigma_{i=1}^{L_{subCH}-1}(N^{SL}_{subchannel}+1-i)^2$$

where $n_{subCH,1}^{start}$ denotes the starting sub-channel index for the second resource $n_{subCH,2}^{start}$ denotes the starting sub-channel index for the third resource $N_{subchannel}^{SL}$ is the number of sub-channels in a resource pool provided according to the higher layer parameter sl-NumSubchannel If TRIV indicates N<sl-MaxNumPerReserve, the starting sub-channel indexes corresponding to sl-MaxNumPerReserve minus N last resources are not used.

The number of slots in one set of the time and frequency resources for transmission opportunities of PSSCH is given by $C_{resel}$ where $C_{resel}$=10*SL_RESOURCE_RESELECTION_COUNTER [10, TS 38.321] if configured else $C_{resel}$ is set to 1.

If a set of sub-channels in slot $t_m^{SL}$ is determined as the time and frequency resource for PSSCH transmission corresponding to the selected sidelink grant (described in [10, TS 38.321]), the same set of sub-channels in slots $t_{m+j \times P'_{rsvp,TX}}^{SL}$ are also determined for PSSCH transmissions corresponding to the same sidelink grant where j=1, 2, ..., $C_{resel}$−1, if provided, is converted from units of msec to units of logical slots, resulting in $P'_{rsvp\_TX}$ according to clause 8.1.7, and $(t_0^{SL}, t_1^{SL}, t_2^{SL}, \ldots)$ is determined by Clause 8. Here, $P_{rsvp\_TX}$ is the resource reservation interval indicated by higher layers.

[ . . . ]

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

A UE is required to decode neither the corresponding SCI formats 2-A and 2-B nor the PSSCH associated with an SCI format 1-A if the SCI format 1-A indicates an MCS table that the UE does not support.

[ . . . ]

8.6 UE PSSCH Preparation Procedure Time

For sidelink dynamic grant and for SL configured grant type 2 activation, if the first sidelink symbol in the sidelink allocation for a PSSCH for a transport block and the associated PSCCH, including the DM-RS and the duplicated symbol, as defined by the slot offset $K_{SL}$ of the scheduling DCI for dynamic grant or the activating DCI for SL configured grant type 2, is no earlier than at symbol L, where L is defined as the next sidelink symbol with its CP starting $T_{proc}=(N_2+d_{2,1})(2048+144)\cdot \kappa 2^{-\mu}\cdot T_C$ after the end of the reception of the last symbol of the PDCCH carrying the DCI scheduling the sidelink transmissions for dynamic grant or activating the SL configured grant type 2, then the UE shall transmit the PSSCH and the associated PSCCH.

$N_2$ is based on $\mu$ of Table 8.6-1, where $\mu$ corresponds to the one of ($\mu_{DL}$, $\mu_{SL}$) resulting with the largest $T_{proc}$;

where the $\mu_{DL}$ corresponds to the subcarrier spacing of the downlink with which the PDCCH carrying the DCI scheduling the PSSCH for dynamic grant or activating the SL configured grant type 2 was transmitted and $\mu_{SL}$ corresponds to the subcarrier spacing of the sidelink channel with which the PSSCH and the associated PSCCH are to be transmitted, and κ is defined in Clause 4.1 of [4, TS 38.211].

$d_{2,1}=1$.

Otherwise the UE may ignore the scheduling DCI for dynamic grant or the activating DCI for SL configured grant type 2.

The value of $T_{proc}$ is used both in the case of normal and extended cyclic prefix.

TABLE 8.6-1

PSSCH preparation time

| μ | PSSCH preparation time $N_2$ [symbols] |
|---|---|
| 0 | 10 |
| 1 | 12 |
| 2 | 23 |
| 3 | 36 |

For sidelink resource allocation mode 1, the UE does not expect that the first sidelink symbol in the sidelink allocation for a PSSCH for retransmission of a transport block and the associated PSCCH, including the DM-RS and the duplicated symbol as defined by the "Time resource assignment" field of the corresponding DCI for dynamic grant or for SL configured grant type 2, or by sl-TimeResourceCG-Type1 for configured grant type 1 starts earlier than at symbol L where L is defined as the next sidelink symbol with its CP starting $T_{prep}+\delta$ after the end of the last symbol of the PSFCH occasion corresponding to the most recent transmission of PSSCH for the same transport block, where $T_{prep}$ is defined in Clause 16.5 of [6, TS 38.213] and $\delta=5\cdot 10^{-4}$ s. Otherwise the UE may skip the retransmission of the PSSCH and the transmission of the corresponding PSCCH.

QUOTATION [2] END

In TS 38.213[3], it specifies sidelink control and feedback channel related procedure in NR.

QUOTATION [3] START

16 UE Procedures For Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by timeresourcepool and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

[ . . . ]

16.4 UE Procedure for Transmitting PSCCH

A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

A UE that transmits a PSCCH with SCI format 1-A using sidelink resource allocation mode 2 [6, TS 38.214] sets
- "Resource reservation period" as an index in sl-ResourceReservePeriod1 corresponding to a reservation period provided by higher layers [11, TS 38.321], if the UE is provided sl-MultiReserveResource
- the values of the frequency resource assignment field and the time resource assignment field as described in [6, TS 38.214] to indicate N resources from a set $\{R_y\}$ of resources selected by higher layers as described in [11, TS 38.321] with N smallest slot indices $y_i$ for $0 \leq i \leq N-1$ such that $y_0 < y_1 < \ldots < y_{N-1} \leq y_0 + 31$,
  where:
  $N = \min(N_{selected}, N_{max\_reserve})$, where $N_{selected}$ is a number of resources in the set $\{R_y\}$ with slot indices $y_j$, $0 \leq j \leq N_{selected} - 1$, such that $y_0 < y_1 < \ldots < y_{N_{selected}-1} \geq y_0 + 31$, and $N_{max\_reserve}$ is provided by sl-MaxNumPerReserve
  each resource, from the set of $\{R_y\}$ resources, corresponds to $L_{subCH}$ contiguous sub-channels and a slot in a set of slots $\{t'_y{}^{SL}\}$, where $L_{subCH}$ is the number of sub-channels available for PSSCH/PSCCH transmission in a slot
  $(t'_0{}^{SL}, t'_1{}^{SL}, t'_2{}^{SL}, \ldots)$ is a set of slots in a sidelink resource pool [6, TS 38.214]
  $y_0$ is an index of a slot where the PSCCH with SCI format 1-A is transmitted.

A UE that transmits a PSCCH with SCI format 1-A using sidelink resource allocation mode 1 [6, TS 38.214] sets
- the values of the frequency resource assignment field and the time resource assignment field for the SCI format 1-A transmitted in the m-th resource for PSCCH/PSSCH transmission provided by a dynamic grant or by a SL configured grant, where $m = \{1, \ldots, M\}$ and M is the total number of resources for PSCCH/PSSCH transmission provided by a dynamic grant or the number of resources for PSCCH/PSSCH transmission in a period provided by a SL configured grant type 1 or SL configured grant type 2, as follows:
- the frequency resource assignment field and time resource assignment field indicate the m-th to M-th resources as described in [6, TS 38.214].

For decoding of a SCI format 1-A, a UE may assume that a number of bits provided by sl-NumReservedBits can have any value.

QUOTATION [3] END

In TS 38.212[4], it specifies sidelink control information in NR

QUOTATION [4] START

8.3 Sidelink Control Information on PSCCH

SCI carried on PSCCH is a $1^{st}$-stage SCI, which transports sidelink scheduling information.

8.3.1 $1^{st}$-stage SCI Formats

The fields defined in each of the $1^{st}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment—

$$\left\lceil \log_2\left(\frac{N_{subChannel}^{SL}(N_{subChannel}^{SL}+1)}{2}\right)\right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period}\rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern}\rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

TABLE 8.3.1.1-1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 8.3.1.1-2

Mapping of Beta_offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 8.3.1.1-3

Number of DMRS port(s)

| Value of the Number of DMRS port field | Antenna ports |
|---|---|
| 0 | 1000 |
| 1 | 1000 and 1001 |

8.3.2 CRC Attachment

CRC attachment is performed according to clause 7.3.2 except that scrambling is not performed.

8.3.3 Channel Coding

Channel coding is performed according to clause 7.3.3.

8.3.4 Rate Matching

Rate matching is performed according to clause 7.3.4.

8.4 Sidelink Control Information on PSSCH

SCI carried on PSSCH is a $2^{nd}$-stage SCI, which transports sidelink scheduling information.

8.4.1 $2^{nd}$-stage SCI Formats

The fields defined in each of the $2^{nd}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1.

CSI request—1 bit as defined in clause 8.2.1 of [6, TS 38.214].

TABLE 8.4.1.1-1

Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits as defined in clause 16.4 of [5, TS 38.213].
New data indicator—1 bit as defined in clause 16.4 of [5, TS 38.213].
Redundancy version—2 bits as defined in clause 16.4 of [6, TS 38.214].
Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Zone ID—12 bits as defined in clause 5.8.11 of [9, TS 38.331].
Communication range requirement—4 bits determined by higher layer parameter sl-ZoneConfigMCR-Index.

8.4.2 CRC Attachment

CRC attachment is performed according to clause 7.3.2 except that scrambling is not performed.

8.4.3 Channel Coding

Channel coding is performed according to clause 7.3.3.

8.4.4 Rate Matching

For $2^{nd}$-stage SCI transmission on PSSCH with SL-SCH, the number of coded modulation symbols generated for $2^{nd}$-stage SCI transmission prior to duplication for the 2nd layer if present, denoted as $Q'_{SCI2}$, is determined as follows:

$$Q'_{SCI2} = \min\left\{\left\lceil\frac{(O_{SCI2} + L_{SCI2}) \cdot \beta^{SCI2}_{offset}}{Q^{SCI2}_m \cdot R}\right\rceil, \left\lceil\alpha \sum_{l=0}^{N^{PSSCH}_{symbol}-1} M^{SCI2}_{sc}(l)\right\rceil\right\} + \gamma$$

8.4.5 Multiplexing of Coded $2^{nd}$-stage SCI Bits to PSSCH

The coded $2^{nd}$-stage SCI bits are multiplexed onto PSSCH according to the procedures in Clause 8.2.1.

QUOTATION [4] END

In TS 38.321 [5], it specifies DRX-related procedure in MAC layer in NR Uu.

QUOTATION [5] START 5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:
drx-onDurationTimer: the duration at the beginning of a DRX cycle;
drx-SlotOffset: the delay before starting the drx-onDurationTimer;
drx-InactivityTimer: the duration after the PDCCH occasion in which a PDCCH indicates a new UL or DL transmission for the MAC entity;
drx-RetransmissionTimerDL (per DL HARQ process except for the broadcast process): the maximum duration until a DL retransmission is received;
drx-RetransmissionTimerUL (per UL HARQ process): the maximum duration until a grant for UL retransmission is received;
drx-LongCycleStartOffset: the Long DRX cycle and drx-StartOffset which defines the subframe where the Long and Short DRX cycle starts;
drx-ShortCycle (optional): the Short DRX cycle;
drx-ShortCycleTimer (optional): the duration the UE shall follow the Short DRX cycle;
drx-HARQ-RTT-TimerDL (per DL HARQ process except for the broadcast process): the minimum duration before a DL assignment for HARQ retransmission is expected by the MAC entity;
drx-HARQ-RTT-TimerUL (per UL HARQ process): the minimum duration before a UL HARQ retransmission grant is expected by the MAC entity;
ps-Wakeup (optional): the configuration to start associated drx-onDurationTimer in case DCP is monitored but not detected;
ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:
drx-onDurationTimer or drx-InactivityTimer configured for the DRX group is running; or
drx-RetransmissionTimerDL or drx-RetransmissionTimerUL is running on any Serving Cell in the DRX group; or
ra-ContentionResolutionTimer (as described in clause 5.1.5) or msgB-Response Window (as described in clause 5.1.4a) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
   2> start the drx-HARQ-RTT-TimerDL for the corresponding HARQ process in the first symbol after the end of the corresponding transmission carrying the DL HARQ feedback;
   2> stop the drx-RetransmissionTimerDL for the corresponding HARQ process.
1> if a MAC PDU is transmitted in a configured uplink grant and LBT failure indication is not received from lower layers:
   2> start the drx-HARQ-RTT-TimerUL for the corresponding HARQ process in the first symbol after the end of the first transmission (within a bundle) of the corresponding PUSCH transmission;
   2> stop the drx-RetransmissionTimerUL for the corresponding HARQ process at the first transmission (within a bundle) of the corresponding PUSCH transmission.
1> if a drx-HARQ-RTT-TimerDL expires:
   2> if the data of the corresponding HARQ process was not successfully decoded:
      3> start the drx-RetransmissionTimerDL for the corresponding HARQ process in the first symbol after the expiry of drx-HARQ-RTT-TimerDL.
1> if a drx-HARQ-RTT-TimerUL expires:
   2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
   2> stop drx-onDurationTimer for each DRX group;
   2> stop drx-InactivityTimer for each DRX group.
1> if drx-InactivityTimer for a DRX group expires:
   2> if the Short DRX cycle is configured:
      3> start or restart drx-ShortCycleTimer for this DRX group in the first symbol after the expiry of drx-InactivityTimer;
      3> use the Short DRX cycle for this DRX group.
   2> else:
      3> use the Long DRX cycle for this DRX group.
1> if a DRX Command MAC CE is received:
   2> if the Short DRX cycle is configured:
      3> start or restart drx-ShortCycleTimer for each DRX group in the first symbol after the end of DRX Command MAC CE reception;
      3> use the Short DRX cycle for each DRX group.
   2> else:
      3> use the Long DRX cycle for each DRX group.
1> if drx-ShortCycleTimer for a DRX group expires:
   2> use the Long DRX cycle for this DRX group.
1> if a Long DRX Command MAC CE is received:
   2> stop drx-ShortCycleTimer for each DRX group;
2> use the Long DRX cycle for each DRX group.
1> if the Short DRX cycle is used for a DRX group, and [(SFN×10)+subframe number]modulo(drx-ShortCycle)=(drx-StartOffset)modulo(drx-ShortCycle):
   2> start drx-onDurationTimer for this DRX group after drx-SlotOffset from the beginning of the subframe.
1> if the Long DRX cycle is used for a DRX group, and [(SFN×10)+subframe number]modulo(drx-LongCycle)=drx-StartOffset:
   2> if DCP monitoring is configured for the active DL BWP as specified in TS 38.213 [6], clause 10.3
      3> if DCP indication associated with the current DRX cycle received from lower layer indicated to start drx-onDurationTimer, as specified in TS 38.213 [6]; or
      3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or
      3> if ps-Wakeup is configured with value true and DCP indication associated with the current DRX cycle has not been received from lower layers:
         4> start drx-onDurationTimer after drx-SlotOffset from the beginning of the subframe.
   2> else:
      3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:
   2> monitor the PDCCH on the Serving Cells in this DRX group as specified in TS 38.213 [6];
   2> if the PDCCH indicates a DL transmission:
      3> start the drx-HARQ-RTT-TimerDL for the corresponding HARQ process in the first symbol after the end of the corresponding transmission carrying the DL HARQ feedback;

NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.

3> stop the drx-RetransmissionTimerDL for the corresponding HARQ process.
      3> if the PDSCH-to-HARQ_feedback timing indicate a non-numerical k1 value as specified in TS 38.213 [6]:
         4> start the drx-RetransmissionTimerDL in the first symbol after the PDSCH transmission for the corresponding HARQ process.
   2> if the PDCCH indicates a UL transmission:
      3> start the drx-HARQ-RTT-TimerUL for the corresponding HARQ process in the first symbol after the end of the first transmission (within a bundle) of the corresponding PUSCH transmission;
      3> stop the drx-RetransmissionTimerUL for the corresponding HARQ process.
   2> if the PDCCH indicates a new transmission (DL or UL) on a Serving Cell in this DRX group:

3> start or restart drx-InactivityTimer for this DRX group in the first symbol after the end of the PDCCH reception.
2> if a HARQ process receives downlink feedback information and acknowledgement is indicated:
3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7];
3> not report semi-persistent CSI configured on PUSCH;
3> if ps-TransmitPeriodicL1-RSRP is not configured with value true:
4> not report periodic CSI that is L1-RSRP on PUCCH.
3> if ps-TransmitOtherPeriodicCSI is not configured with value true:
4> not report periodic CSI that is not L1-RSRP on PUCCH.
1> else:
2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7] in this DRX group;
3> not report CSI on PUCCH and semi-persistent CSI configured on PUSCH in this DRX group.
2> if CSI masking (csi-Mask) is setup by upper layers:
3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
4> not report CSI on PUCCH in this DRX group.
NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).
Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

QUOTATION [5] END

In RP-202846 [6], it specifies WID on NR sidelink enhancement.

QUOTATION [6] START

3 Justification

3GPP has been developing standards for sidelink as a tool for UE to UE direct communication required in various use cases since LTE. The first standard for NR sidelink is to be completed in Rel-16 by the work item "5G V2X with NR sidelink" where solutions including NR sidelink are being specified mainly for vehicle-to-everything (V2X) while they can also be used for public safety when the service requirement can be met.

Meanwhile, the necessity of NR sidelink enhancement has been identified. For V2X and public safety, the service requirements and operation scenarios are not fully supported in Rel-16 due to the time limitation, and SA works are ongoing on some enhancement in Rel-17 such as architecture enhancements for 3GPP support of advanced V2X services—Phase 2 (FS_eV2XARC_Ph2) and System enhancement for Proximity based Services in 5GS (FS_5G_ProSe). In addition, other commercial use cases related to NR sidelink are being considered in SA WGs via several work/study items such as Network Controlled Interactive Service (NCIS), Gap Analysis for Railways (MONASTERYEND), Enhanced Relays for Energy eFficiency and Extensive Coverage (REFEC), Audio-Visual Service Production (AVPROD). In order to provide a wider coverage of NR sidelink for these use cases and be able to provide the radio solutions in accordance with the progress in SA WGs, it is necessary to specify enhancements to NR sidelink in TSG RAN.

TSG RAN started discussions in RAN #84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

While several work areas have been identified in the discussion, some important principles were also discussed regarding the 3GPP evolution for NR sidelink In dealing with different use cases in the evolution of NR sidelink, WGs should strive to achieve maximum commonality between commercial, V2X, and Critical Communication usage of sidelink in order to avoid duplicated solutions and maximize the economy of scale. In addition, enhancements introduced in Rel-17 should be based on the functionalities specified in Rel-16, instead of designing the fundamental NR sidelink functionality again in Rel-17.

4 Objective 4.1 Objective Of SI Or Core Part WI Or Testing Part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN #89) [RAN1]
  Note: TR 37.885 is reused for the other evaluation assumption and performance metric. Vehicle dropping model B and antenna option 2 shall be a more realistic baseline for highway and urban grid scenarios.
2. Resource allocation enhancement:
Specify resource allocation to reduce power consumption of the UEs [RAN1, RAN2]
  Baseline is to introduce the principle of Rel-14 LTE sidelink random resource selection and partial sensing to Rel-16 NR sidelink resource allocation mode 2.
  Note: Taking Rel-14 as the baseline does not preclude introducing a new solution to reduce power consumption for the cases where the baseline cannot work properly.
  This work should consider the impact of sidelink DRX, if any.
  Study the feasibility and benefit of solution(s) on the enhancement(s) in mode 2 for enhanced reliability and reduced latency in consideration of both PRR and PIR defined in TR37.885 (by RAN #91), and specify the identified solution(s) if deemed feasible and beneficial [RAN1, RAN2]
  Inter-UE coordination with the following.
    A set of resources is determined at UE-A. This set is sent to UE-B in mode 2, and UE-B takes this into account in the resource selection for its own transmission.
    Note: The solution should be able to operate in-coverage, partial coverage, and out-of-coverage and to address consecutive packet loss in all coverage scenarios.
    Note: RAN2 work will start after RAN #89.
3. Sidelink DRX for broadcast, groupcast, and unicast [RAN2]
  Define on- and off-durations in sidelink and specify the corresponding UE procedure
  Specify mechanism aiming to align sidelink DRX wake-up time among the UEs communicating with each other
  Specify mechanism aiming to align sidelink DRX wake-up time with Uu DRX wake-up time in an in-coverage UE

QUOTATION [6] END

In RAN1 #103-e meeting [7], RAN1 has some agreements about NR V2X.

QUOTATION [7] START

Agreements:
Partial sensing based RA is supported as a power saving RA scheme
  FFS details
Random resource selection is supported as a power saving RA scheme
  FFS any changes or enhancement
  FFS on conditions to apply random resource selection
Agreements:
In R17, a SL Mode 2 Tx resource pool can be (pre-)configured to enable full sensing only, partial sensing only, random resource selection only, or any combination(s) thereof
  FFS details, including usage, potential restrictions, whether/how any enhancement or condition is needed for the coexistence of full sensing and power saving RA scheme(s) in a same resource pool, etc.
Agreements:
Further study congestion control based on CBR and CR for power saving RA schemes
  Identify necessary changes from R16 CBR/CR (if any), including transmission resource selection and transmission parameters that can be adjusted and applicable to power savings RA schemes
  Note: this is not intended to require all UEs to perform sensing for the purpose of CBR measurement

QUOTATION [7] END

In RAN2 #112-e meeting [8], RAN2 has some agreements about NR V2X.

QUOTATION [8] START

| Agreements on SL DRX: |
| --- |
| 1: Sidelink DRX needs to support sidelink communications for both in and out of network's coverage scenarios. |
| 2: RAN2 will prioritize normal use case without consideration of relay UE use case in Rel-17. |
| 3: Support SL DRX for all casting types. |
| 4: If a UE is in SL active time, UE should monitor PSCCH. FFS on PSSCH. FFS for sensing impacts. |
| 5: RAN2 is not going to introduce SL paging and SL PO for SL DRX. |
| 6: As baseline, for Sidelink DRX for SL unicast, it is proposed to inherit and use timers similar to what are used in Uu DRX. FFS for SL broadcast/groupcast. FFS on detailed timers. |
| 7: Working assumption: SL DRX should take PSCCH monitoring also for sensing (in addition to data reception) into account if SL DRX is used. |
| 8: Support of long DRX cycle for SL unicast should be assumed as a baseline. FFS on the need of short DRX cycle. |
| 9: Deprioritize SL WUS from RAN2 point of view in Rel-17. |

QUOTATION [8] END

In R1-2007615 [9], it proposes extended partial sensing window for aperiodic traffic.

QUOTATION [9] START 2.2.2 Aperiodic Traffic

Figure 5:
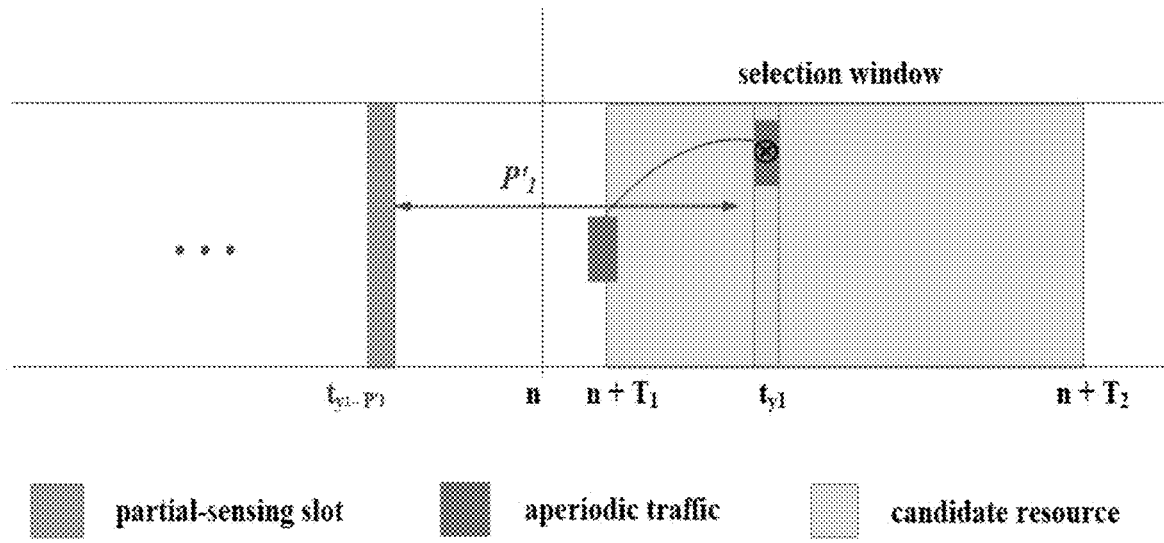
FIG. 5 is a reproduction of FIG. 4 of R1-2007615, showing that an aperiodic reservation (indicated in SCI) cannot be monitored.

LTE-V partial sensing only deals with P-UE for periodic broadcast traffic [2], while NR sidelink also needs to consider aperiodic traffic in commercial use cases. Given that LTE-V partial-sensing is only performed at a subset of subframes to evaluate periodic reservations by other UEs to determine the candidate resource for PSCCH/PSSCH transmission, any aperiodic traffic which occurs before PSCCH/PSSCH transmission cannot be monitored by the UE, as shown in FIG. 4 (FIG. 5). In this example, the partial sensing UE may select a candidate resource which was reserved by an aperiodic PSSCH retransmission.

FIG. 5 is a reproduction of FIG. 4 of R1-2007615, showing that an aperiodic reservation (indicated in SCI) cannot be monitored.
Observation 3: The LTE-V partial sensing mechanism, when introduced to NR sidelink, cannot evaluate NR's aperiodic traffic and therefore the NR partial sensing resource allocation performance in terms of resource selection collision would be degraded compared to LTE-V.

Figure 6:
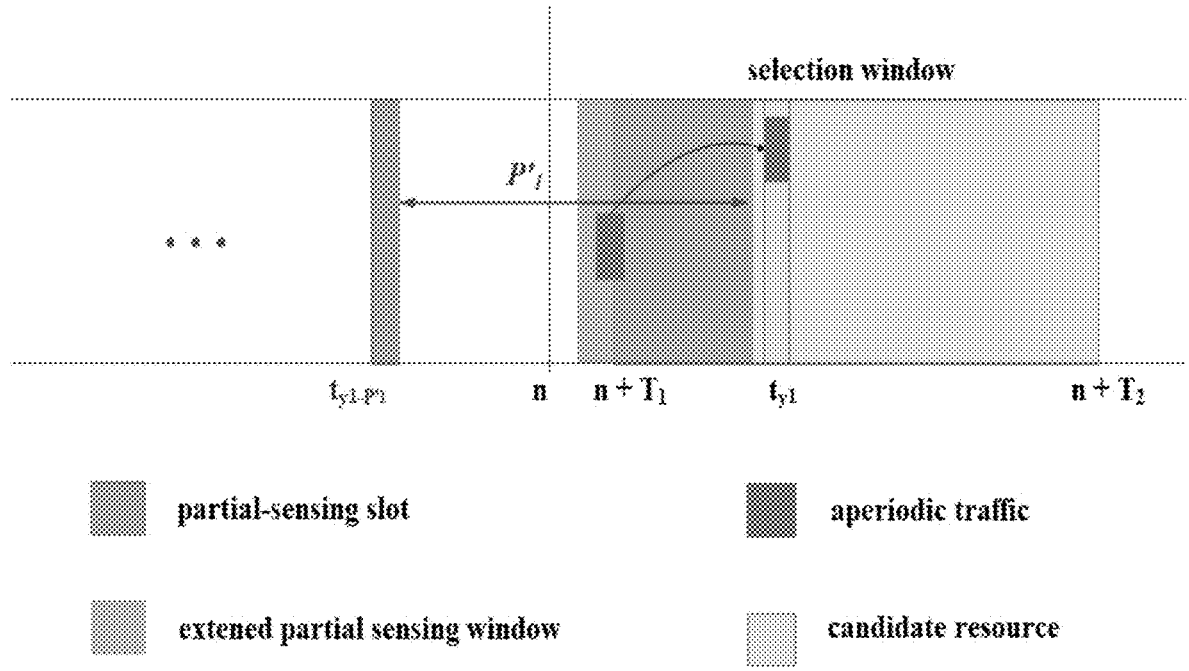
FIG. 6 is a reproduction of FIG. 5 of R1-2007615, showing an extended partial sensing window for aperiodic traffic.

In Rel-16 sidelink, retransmission(s) for aperiodic traffic can be reserved in advance with up to 32 slots via a SCI, and the re-evaluation procedure (triggered at slot m-T₃) was introduced prior to a SCI transmission in slot m to overcome the potential resource collision caused by aperiodic traffic. One proposal is to introduce an extended sensing window before the first candidate resource in slot $t_{y_1}$ among the selected candidate resource sets within the selection window, as shown in FIG. 5 (FIG. 6). A TX UE may combine the sensing results based on the partial sensing slots monitored for periodic reservation as well as slots monitored within the extended partial sensing window to determine whether the first candidate resource in slot $t_{y_1}$ would be excluded from $S_A$.

FIG. 6 is a reproduction of FIG. 5 of R1-2007615, showing an extended partial sensing window for aperiodic traffic.
Proposal 4: NR partial sensing, based on the LTE-V mechanism, can be enhanced by introducing a short sensing window before the first selected candidate resource to take into account aperiodic traffic reservations.

Re-evaluation and pre-emption check was introduced in Rel-16 NR-V to allow UE re-selecting resource to avoid potential transmission collision, which would improve the reliability of mode 2 operation. However, taking into account power consumption constraints, it is not necessary to perform re-evaluation and pre-emption check before every transmission. As explained above, in addition to periodic reservation for partial sensing in LTE-V, NR sidelink also supports aperiodic reservation as well as pre-emption. Re-evaluation and pre-emption check are helpful on reducing resource collision probability, and some conditions to trigger those behaviors can be considered, so that the reliability of mode 2 operation can be guaranteed whilst reducing power consumption for a power saving UE.
Proposal 5: Support re-evaluation and pre-emption check for UES operating power saving.

QUOTATION [9] END

In R1-2007688 [10], it proposes additional sensing window for aperiodic traffic.

QUOTATION [10] START 3.1. Enhancement on Partial Sensing Mechanism

However, in NR V2X, there are some aspects different from LTE SL that should be considered, such as the support of aperiodic reservation, flexible resource reservation periods, etc. In the following, we identify some problems when applying partial sensing in NR SL.
The Aperiodic Traffic
In LTE V2X, partial sensing mechanism is designed considering periodic traffic. However, in NR V2X, aperiodic resource reservation is introduced to support aperiodic traffic. Consequently, the aperiodic resource allocation from neighbor UEs just before the selection window may not be detected in advance by the sensing UE according to the LTE partial sensing mechanism. One simple approach to mitigate this issue is to add an additional sensing window before the selection window of the UE. One example is illustrated in FIG. 4 (FIG. 7): when resource selection is triggered for a UE, the UE sets a short-term sensing window, and determines selection window after this short-term sensing window. The preliminary simulation results for this approach can be found in section 3.2, which shows that such a simple approach can maintain the PRR performance while reducing the power consumption.

Figure 7:
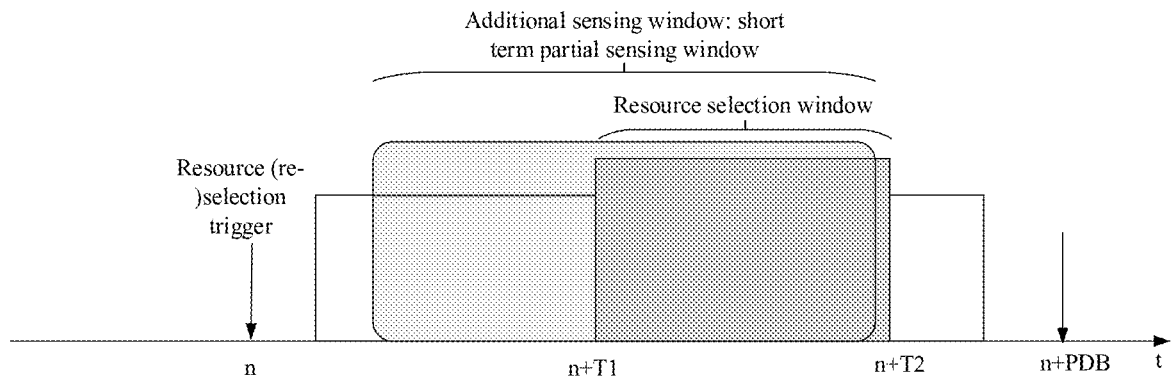
FIG. 7 is a reproduction of FIG. 4 of R1-2007688, showing an additional sensing window: short term partial sensing window.

FIG. 7 is a reproduction of FIG. 4 of R1-2007688, showing an additional sensing window: short term partial sensing window.

Therefore, we give the following proposal:
Proposal 5: To reduce the collision possibility caused by aperiodic resource allocation, a short term partial sensing window before the resource selection window should be introduced for NR partial sensing mechanism.

QUOTATION [10] END

In R1-2008189 [11], it proposes extended partial sensing window for aperiodic traffic.

QUOTATION [11] START 2.2 Partial Sensing

In Rel-14 LTE V2X, partial sensing is an effective way to balance power consumption and collision avoidance for pedestrian UEs. The principle of partial sensing is that a UE determines a set of subframes which consists of at least Y subframe in resource selection window as a candidate resource set, then for each subframe $t_y^{SL}$ within the candidate resource set, UE senses on a subset of previous subframes $t_{y-k \times P_{step}}^{SL}$, on which other sidelink UEs may reserve resource on subframe $t_y^{SL}$ for periodical traffic. Then UE performs RSRP-based resource exclusion and RSSI-based ranking within the candidate resource set according to sensing result.

With limited sensing window length by monitoring periodical subframes corresponding resource selection window, LTE pedestrian UEs can detect potential collisions and estimate the quality of each resource within resource selection window. The principle can be similarly reused in Rel-17 NR sidelink. NR sidelink UE can generate the candidate resource set, then for each slot $t_y^{SL}$ within the candidate resource set, NR sidelink UE further determines a set of previous slots on which other sidelink UEs may reserve resource on slot $t_y^{SL}$. UE perform sensing on each set and then exclude candidate resources according to the SCI decoded in the sensing slot sets.

The feasibility of full or partial sensing procedure of LTE V2X is based on a precondition that the most traffic in LTE sidelink are periodical, and the impact of event-triggered traffic was evaluated as acceptable. UE could predict when the packet arrives from higher layer to be transmitted, and after receiving one transmission from another sidelink UE, UE could also predict its following transmissions in subsequent periods. Therefore, a simple back tracking solution with periodicity configured by higher layer is good enough to protect the PRR performance in Mode 2.

However, NR sidelink considers scenarios of aperiodic transmission importantly and sensing mechanism is targeting both periodic and aperiodic traffic types. Therefore, the performance of LTE-like partial sensing needs further evaluation and may not satisfy reliability requirement of some NR traffics.

Proposal 2: Reusing the principle of partial sensing in LTE sidelink, and consider the feasibility for partial sensing corresponding to both aperiodic and periodic traffics.

Figure 8:
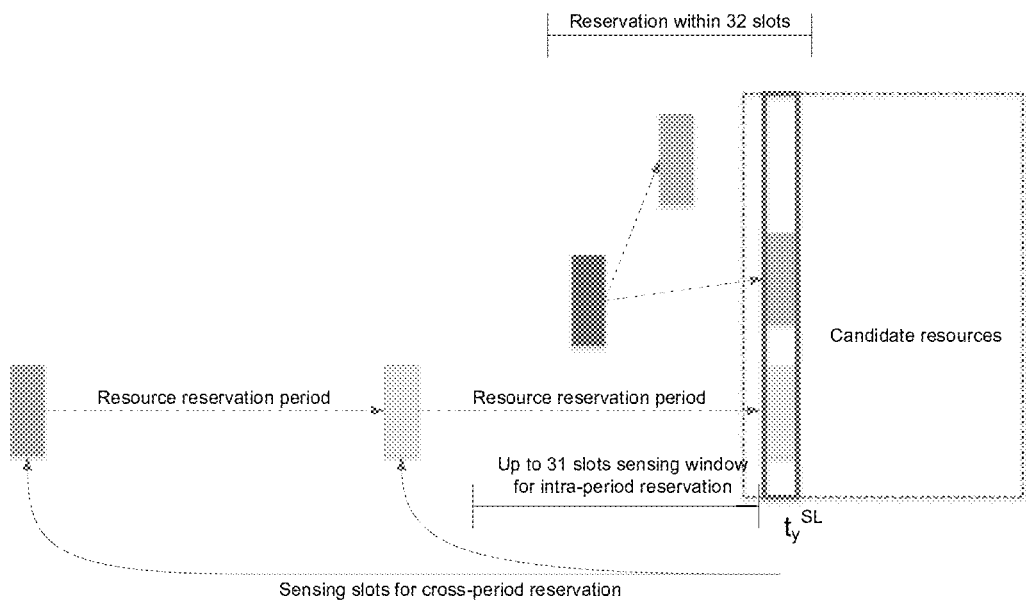
FIG. 8 is a reproduction of FIG. 1 of R1-2008189, showing partial sensing for intra- and cross-period reservations.

FIG. 8 is a reproduction of FIG. 1 of R1-2008189, showing partial sensing for intra- and cross-period reservations.

In NR sidelink system, potential future transmissions by other UE can be reflected by received resource reservation indicated in SCI. As shown in FIG. 1 (FIG. 8), single SCI format may reserve up to 2 additional sidelink resources within a 32 ms time window. Therefore, per slot $t_y^{SL}$ within candidate resource corresponds to a set of sensing slots that may reserve resources on slot $t_y^{SL}$ for aperiodic traffic, and the set of sensing slots can be determined by the range of SCI reservation, such as up to 31 slots before slot $t_y^{SL}$.

Cross-period resource reservation is also supported by Rel-16 sidelink A period of {0, 100, 200, 300, 400, 500, 600, 700, 800, 900, 1000} may be signaled in SCI to reserve resource in the subsequent period. Similarly as in LTE P2V use case, for each slot $t_y^{SL}$ within candidate resource of NR partial sensing, UE should monitor sensing slot corresponding to $t_y^{SL}$ in previous period with the configured set of reservation periods.

In addition, it can be considered to introduce re-evaluation check and pre-emption check procedure in NR partial sensing to avoid collision on the SL and improve PRR.

Sidelink power saving will benefit from collision avoidance methods since HARQ retransmission since interference can be minimized. Therefore, UE could try to acquire resource reservation information from neighbour UEs as much as possible by using all methods above. However, the methods corresponds to different sensing windows and will increase power consumption during partial sensing procedure. Therefore, the trade-off between performance gain and power consumption should be carefully analyzed for partial sensing enhancement in NR sidelink Proposal 3: Further study the following methods for NR sidelink partial sensing:

Partial sensing for intra-period resource reservation
Partial sensing for inter-period resource reservation
Re-evaluation and pre-emption

QUOTATION [11] END

In R1-2009072 [12], it proposes extended partial sensing window for aperiodic traffic.

QUOTATION [12] START 2.1 Clarifications on Partial Sensing Definition

It is important to clarify upfront that when partial sensing is used, the savings essentially come from not using the RX chain i.e. the UE is able to turn off the RX circuitry and do not decode any of the sidelink channels. In previous RAN1 contributions, some companies have expressed the view that the power savings from partial sensing mechanism comes from saving the sensing computations. In our view, the energy cost of performing the sensing operation once UE has decoded the control information is negligible. That is, if the RX chain is active, the energy saving obtained by not executing the sensing operations is nominal.

Proposal 1 RAN1 assumes that the energy saving in partial sensing comes from the possibility of turning off the RX chain during the time periods when the UE is not sensing.

Furthermore, in LTE, the assumption for partial sensing mechanism was that the pedestrian UEs would act only as transmitters. RAN1 did not specify mechanisms for aligning TX and RX behaviour for partial sensing other than pool configuration. The alignment issue was solved with the implicit assumption that RX UEs would perform full sensing and monitor the channel continuously.

Observation 3 LTE partial sensing mechanism is based on the assumption that the receiver UE is always listening/receiving, and TX/RX alignment is not specified.

However, in NR, the assumption on RX UE(s) sensing and monitoring the channel continuously may not be valid in all scenarios. Therefore, it is important to assume that RX UE(s) may not be active all the time i.e. RX UE(s) may not monitor the channel continuously.

Proposal 2 In NR, it is assumed that the RX UE(s) may not monitor the channel continuously.

Hence, it is important to clarify the differences and relationship of the partial sensing mechanism to be specified in RAN1 and the SL DRX configuration which is specified in RAN2. In our view, both mechanisms should be defined in a complementary manner, i.e., they need to be aligned in order to optimize the savings on SL UE power consumption. Based on this alignment between the partial sensing and the SL DRX configuration, in our view, the resource allocation mechanism defined in RAN1 for partial sensing does not provide a separate Tx/Rx alignment. In other words, the Tx/Rx alignment is achieved by using the DRX alignment procedure which is also one of the objectives of the DRX procedure to be specified.

Proposal 3 No separate TX/RX alignment procedure is specified in RAN1 for partial sensing.

As a consequence of the above proposal, when SL DRX is (pre-)configured, the (partial) sensing performed by the UEs is only available during the active time defined by the SL DRX configuration. Similarly, the resource selection window, i.e., the mechanism where a UE selects the resource for the next transmission(s), should also be restricted to the active time periods defined by the SL DRX configuration.

Proposal 4 The (partial) sensing operation and the resource selection performed by a UE takes into account the active time defined by SL DRX configuration, if (pre-)configured.

More details related to the relationship between SL DRX and the partial sensing mechanism are included in our companion contribution [3].

2.2 Description of the Solution

One of the main differences of NR SL as compared to LTE SL is that NR SL is designed considering both periodic and aperiodic traffic types; whereas LTE SL was only focusing on traffic of periodic nature. In our view, considering aperiodic traffic, which is a common traffic type for advanced V2X use cases and many public safety use cases, demands some procedural differences as compared to the LTE partial sensing mechanism. For instance, in LTE, an RRC parameter gapCandidateSensing [4] is (pre-)configured which is then used to determine the subframe indices assuming the periodic nature of traffic (multiple of 100 ms).

Observation 4 Partial sensing mechanism specified for LTE Rel-14 is optimized for periodic traffic type only.

2.2.1 Definition of Partial Sensing Window

As described above, the partial sensing procedure in NR SL should be specified considering also aperiodic traffic. This means that it is not optimum to (pre-)configure the sensing occasions within the sensing window assuming certain periodicity as it was done in LTE SL. Furthermore, in NR SL possible periodicities are also much more in number and shorter as compared to LTE (e.g. 1:99, 100, 200, 300, 400, 500, 600, 700, 800, 900, 1000 in milliseconds). Therefore, it is not possible to define a partial sensing procedure similar to LTE SL which takes into account all the possible periodicities of NR.

Observation 5 The partial sensing procedure in LTE SL is not suitable for traffic types/patterns considered for NR SL.

Before going into details of partial sensing procedure, it is important to first clarify the definition of partial sensing window in NR SL as compared to the normal sensing window which is defined in Rel. 16 and LTE partial sensing procedure. According to Rel. 16 sensing procedure, the length of sensing window can be (pre-)configured with a value of 100 ms or 1100 ms. In our view, when a partial sensing is (pre-)configured for a resource pool, a UE can perform reduced sensing i.e. at limited sensing occasions. However, in contrast to LTE where the sensing occasions are determined considering the periodic nature of the traffic i.e., periodically repeating with the step of 100 ms, NR should determine the sensing occasions focusing on the aperiodic nature of the traffic. This means that a number of consecutive sensing occasions (which we also call as partial sensing window in the FIG. 2 below (FIG. 9)) needs to be defined whose length can be smaller than normal sensing window and the UE triggers the sensing procedure for aperiodic traffic after the packet arrival.

Proposal 5 The partial sensing procedure supports that a UE starts sensing after the packet arrival.

Proposal 6 A number of consecutive sensing occasions are defined as partial sensing window which is smaller than normal sensing window.

Figure 9:
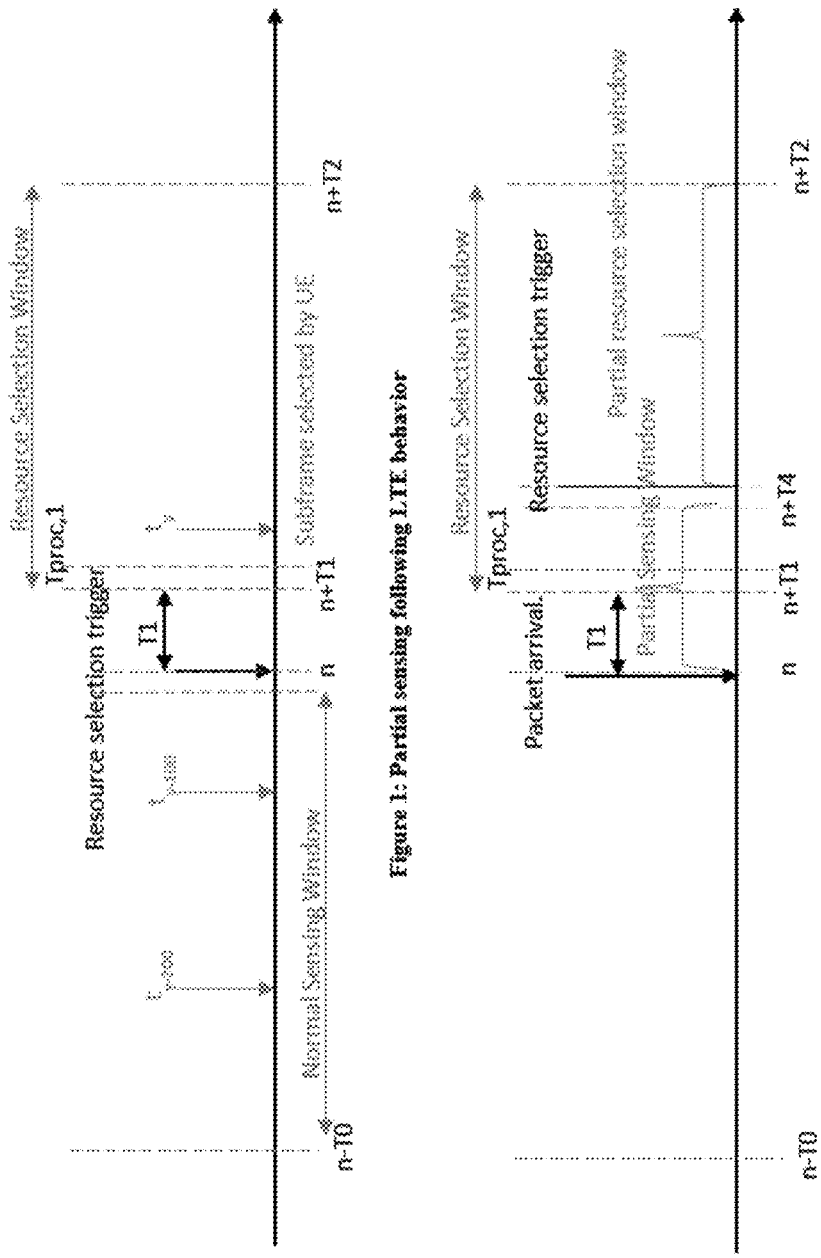
FIG. 9 is a reproduction of FIGS. 1 and 2 of R1-2009072, with FIG. 1 showing partial sensing following LTE behavior and FIG. 2 showing partial sensing for NR (considering aperiodic nature of traffic).

FIG. 9 is a reproduction of FIGS. 1 and 2 of R1-2009072, with FIG. 1 showing partial sensing following LTE behavior and FIG. 2 showing partial sensing for NR (considering aperiodic nature of traffic).

To exemplify the (pre-)configuration of 'partial sensing window', it could be that partial sensing window duration is defined as to be [n, n+T4), where the T4 value is chosen by UE within a certain range and the minimum value of T4 can be (pre-)configured to be zero logical slots (i.e. no sensing is performed). Furthermore, in our view, the exact value of T4 can be adapted to optimize the performance of partial sensing as described in Section 2.1.2. below. However, the maximum possible value of T4 is limited by the PDB of the packet. In other words, T4 value is always less than T2 value. Furthermore, periodic sensing occasions as shown in FIG. 1 (FIG. 9) can be used in NR SL on top of procedure described in FIG. 2 (FIG. 9) for aperiodic traffic.

Observation 6 Periodic sensing occasions similar to LTE procedure can be applied on top of partial sensing procedure for aperiodic traffic as described in Proposal 5 and Proposal 6.

QUOTATION [12] END

In R1-2009272 [13], it proposes extended partial sensing window for aperiodic traffic.

QUOTATION [13] START

2.2 Sensing After Resource Selection Trigger

In this section, we present two methods that trade off some power consumption and perform sensing after receiving the resource selection trigger to improve the performance without performing full sensing. The first uses re-evaluation after random resource selection and the second performs sensing after a resource selection trigger is received and then selects resources.

Re-evaluation enables the UE to change selected, but not-yet-signalled resources, based on sensing information. This allows the UE to choose different resources and avoid collisions, improving performance. In the first proposed scheme, a UE that performs random selection additionally starts sensing and performs re-evaluation after selecting resources. The sensing information used for re-evaluation would then begin at the resource selection trigger and the UE continues to perform sensing and re-evaluation until the last retransmission of the TB. This process is illustrated in FIG. 2 (FIG. 10).

Figure 10:
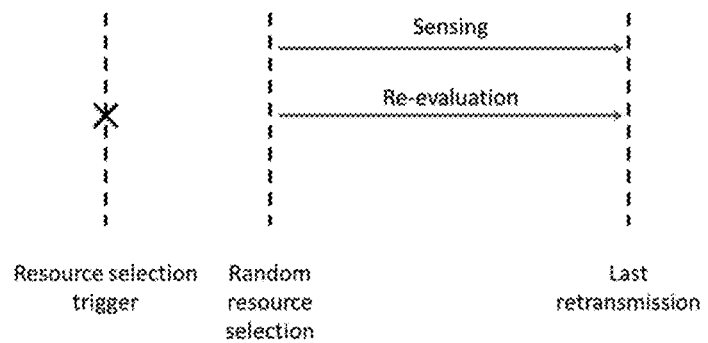
FIG. 10 is a reproduction of FIG. 2 of R1-2009272, showing performing random selection with subsequent revaluation.

FIG. 10 is a reproduction of FIG. 2 of R1-2009272, showing performing random selection with subsequent revaluation.

In the second method, the UE performs sensing after a resource selection trigger is received. Then resource selection is performed after the sensing window. This enables the UE to only perform sensing when necessary to benefit from the performance improvement brought by sensing while still conserving energy. FIG. 3 (FIG. 11) illustrates this process, which compatible with both periodic and aperiodic traffic, especially for latency tolerant transmissions.

Figure 11:
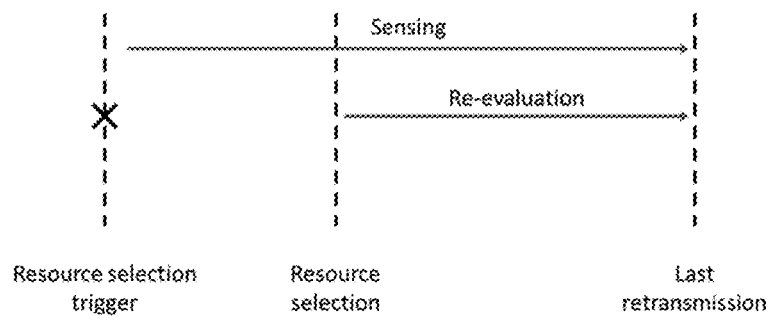
FIG. 11 is a reproduction of FIG. 3 of R1-2009272, showing performing sensing after resource selection trigger.

FIG. 11 is a reproduction of FIG. 3 of R1-2009272, showing performing sensing after resource selection trigger.

Observation 3: Performing sensing after the resource selection trigger enables the UE to only sense when needed and reduces power consumption.

QUOTATION [13] END

Some or all of the following terminology and assumptions may be used herein.

BS: a network central unit or a network node in NR which is used to control one or multiple TRPs which are associated with one or multiple cells. Communication between BS and TRP(s) is via fronthaul. BS may be referred to as central unit (CU), eNB, gNB, or NodeB.

TRP: a transmission and reception point provides network coverage and directly communicates with UEs. TRP may be referred to as distributed unit (DU) or network node.

Cell: a cell is composed of one or multiple associated TRPs, i.e. coverage of the cell is composed of coverage of all associated TRP(s). One cell is controlled by one BS. Cell may be referred to as TRP group (TRPG).

Slot: a scheduling unit in NR. Slot duration is 14 OFDM symbols.

For the network side:

Downlink timing of TRPs in the same cell are synchronized.

RRC layer of network side is in BS.

For the UE side:

There are at least two UE (RRC) states: connected state (or called active state) and non-connected state (or called inactive state or idle state). Inactive state may be an additional state or belong to connected state or non-connected state.

Issues And Solutions:

In LTE/LTE-A sidelink (see e.g., TS 36.213 V16.4.0), sensing-based resource selection procedures are supported in sidelink transmission mode 4. As an instance shown in FIG. 12, a User Equipment (UE) has a candidate resource set comprising multiple candidate resources. The available candidate resource set is restricted with time interval [n+$T_1$, n+$T_2$], which may be called as resource selection window. When (periodic-based) partial sensing is configured, the UE determines, by its implementation, a set of subframes which consists of at least Y subframes within the time interval [n+$T_1$, n+$T_2$], wherein the available candidate resource set are in the set of subframes. If full sensing is performed, e.g., partially sensing is not configured, the available candidate resource set are in the (full) time interval [n+$T_1$, n+$T_2$]. Preferably, a candidate resource may mean one candidate single-subframe resource. One candidate resource may comprise one or multiple resource units. The resource unit may be a sub-channel Preferably, the resource unit may comprise multiple (physical) resource blocks in a Transmission Time Interval (TTI). The TTI may be a subframe in LTE.

Based on the sensing result within a sensing duration, the UE may generate a valid/identified resource set, wherein the valid/identified resource set is a subset of the candidate resource set. The generation of the valid/identified resource set may be performed via excluding some candidate resources from the candidate resource set—for instance, step 2-1 and step 2-2 shown in FIG. 12. The generation of the valid/identified resource set may be performed via selecting some valid/identified candidate resources—for instance, step 3-1 shown in FIG. 12. And then, the UE selects one or some valid/identified resources from the valid/identified resource set to perform sidelink transmission from the UE. The resource selection for sidelink transmission may be randomly selected from the valid/identified resource set—for instance, step 3-2 shown in FIG. 12.

As in TS 36.213 V16.4.0, the first excluding step is that if the UE does not monitor/sense a TTI z, the UE cannot expect whether the candidate resources in TTI "z+$P_{any}$" are occupied or not, wherein $P_{any}$ means any possible periodicity for transmission. For instance, the first excluding step is shown as step 2-1 in FIG. 12. For the case of $P_{any}$>=100 ms, the UE excludes the candidate resources in TTI "z+$P_{any}$" and excludes the candidate resources for which the UE may have possible transmission occurred in TTI "z+$P_{any}$". For the case of $P_{any}$<100 ms, the UE excludes the candidate resources in TTI "z+q·$P_{any}$" and excludes the candidate resources for which the UE may have possible transmission occurred in TTI "z+q·$P_{any}$", wherein q is 1, 2, . . . , 100/$P_{any}$. The parameter q means that the UE excludes multiple candidate resources with period $P_{any}$ within time interval [z, z+100]. The possible transmission may mean a transmission on a selected resource. The possible transmission may mean a periodic transmission of a transmission on a selected resource. Moreover, $P_{any}$ means any possible periodicity configured by higher layer.

The second excluding step is that if the UE receives/detects a control signaling in a TTI m, the UE may exclude the candidate resources according to the received control signaling. For instance, the second excluding step is shown as step 2-2 in FIG. 12. More specifically, if the UE receives/detects a control signaling scheduling a transmission in a TTI m and the measurement result of the scheduled transmission and/or the control signal is over a threshold, the UE may exclude the candidate resources according to the received control signaling. The measurement result may be Reference Signal Received Power (RSRP). More specifically, the measurement result may be Physical Sidelink Shared Channel (PSSCH)-RSRP. The control signaling may indicate the resources of the scheduled transmission and/or periodicity of the scheduled transmission, $P_{RX}$. The excluded candidate resources according to the received control signaling are the resources of next one scheduled transmission based on the resources of the scheduled transmission and periodicity of the scheduled transmission, such as for the case of $P_{RX}$>=100 ms. Moreover, the excluded candidate resources according to the received control signaling are the resources of next multiple scheduled transmissions based on the resources of the scheduled transmission and periodicity of the scheduled transmission, such as for the case of $P_{RX}$<100 ms. The next multiple scheduled transmissions may be with period $P_{RX}$ within time interval [m, m+100]. If the control signaling indicates that there is no next scheduled transmission, or the control signaling indicates that the resource of scheduled transmission is not kept in next time, or the control signaling indicates that the scheduled transmission is the last transmission from the UE transmitting the control signaling, or the control signaling indicates that the periodicity of the scheduled transmission is indicated as zero, the UE may not exclude candidate resources according to the received control signaling.

Figure 12:
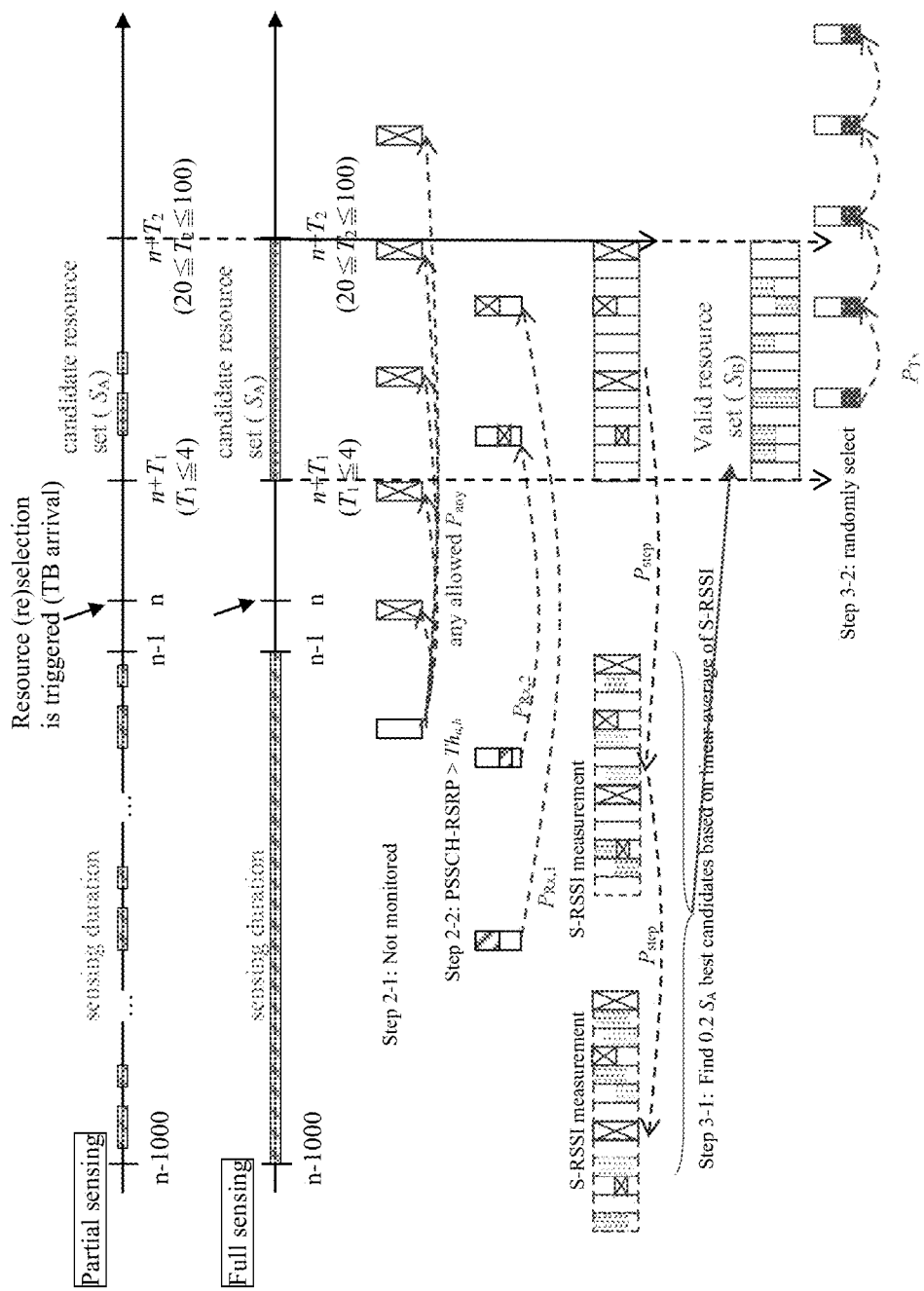
FIG. 12 shows a UE having a candidate resource set comprising multiple candidate resources, in accordance with embodiments of the present invention.

After the first excluding step and the second excluding step, the UE may select some valid/identified candidate resources from the remaining candidate resources, such as shown in step 3-of FIG. 12. The UE may measure resources in the sensing duration, wherein the measured resources are associated with the remaining candidate resources after step 2-1 and step 2-2. More specifically, for a remaining candidate resource, the associated measured resources in the sensing duration are in the occasions with multiple times of a time period from the remaining candidate resources. For instance, if the time period is 100 TTIs, the associated measured resources in the sensing duration are in the TTI "n−j·100", where j is a positive integer, for a remaining candidate resource in TTI n. Moreover, the associated measured resources in the sensing duration are with the same frequency resources as the remaining candidate resource. More specifically, the measurement is S-Received Signal Strength Indicator (S-RSSI) measurement.

Based on the measurement, the UE can derive metric for each remaining candidate resource. The metric for a remaining candidate resource may be linear average of S-RSSI measured from its associated measured resources in the sensing duration. And then, the UE may select valid/identified candidate resources based on the metric of each remaining candidate resource. Preferably, an action is that a remaining candidate resource with the smallest metric is selected as valid/identified candidate resource and moved into a valid/identified resource set. Repeating the action until the UE selects a number of remaining candidate resources as valid candidate resources and moves the number of remaining candidate resources into the valid/identified resource set. For instance, the number is larger than or equal to 20% of total candidate resources. The number is larger than or equal to 20% of cardinality of the candidate resource set.

Based on the current (partially) sensing procedures, the UE can determine the valid/identified resource set. The valid/identified resource set may be reported to higher layers for sidelink transmission from the UE. The UE may select one or some valid/identified resources from the valid/identified resource set to perform sidelink transmission from the UE. The sidelink transmission from the UE may be PSSCH transmission. Preferably, the sidelink transmission from the UE may be device-to-device transmission.

For NR sidelink transmission, there are two sidelink resource allocation modes defined for NR-Vehicle-to-Everything (V2X) sidelink communication (see e.g., TS 38.214 V16.4.0):

mode 1 is that the base station/network node can schedule sidelink resource(s) to be used by the UE for sidelink transmission(s), which concept is similar as sidelink transmission mode 3 in LTE/LTE-A (see e.g., TS 36.213 V16.4.0).

mode 2 is that the UE determines (e.g., base station/network node does not schedule) sidelink transmission resource(s) within sidelink resources configured by the base station/network node or pre-configured sidelink resources, which concept is similar as sidelink transmission mode 4 in LTE/LTE-A (see e.g., TS 36.213 V16.4.0).

For network scheduling mode, e.g., NR sidelink resource allocation mode 1, the network node may transmit a sidelink (SL) grant on Uu interface for scheduling resources of PSCCH and/or PSSCH. The V2X UE may perform PSCCH and PSSCH transmissions on PC5 interface, in response to the received sidelink grant. The Uu interface means the wireless interface for communication between network and UE. The PC5 interface means the wireless interface for communication (directly) between UEs/devices.

For UE (autonomous) selection mode, e.g., NR sidelink resource allocation mode 2, since transmission resource is not scheduled via the network, the UE may require performing sensing before selecting a resource for transmission (e.g., sensing-based transmission) in order to avoid resource collision and interference from or to other UEs. Currently, full sensing is supported in NR sidelink. Partial sensing is not supported/designed for NR sidelink. Moreover, step 3-1 shown in FIG. 12 is not applied for sensing procedure in NR sidelink (see e.g., TS 38.214 V16.4.0). Based on the result of the sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission.

In the Justification and objective of work item for NR Rel-17 V2X, power saving is one of enhancement to enable UEs with battery constraint to perform sidelink operations in a power efficient manner. To reduce power consumption, it may specify/design partial sensing to Rel-17 NR sidelink resource allocation mode 2. Thus, a UE may perform partial sensing to select sidelink resources, instead of performing full sensing with more power consumption. Note that the partial sensing and resource selection is performed from the transmitter aspect of the UE.

In another aspect, work item for NR Rel-17 V2X may specify/design sidelink Discontinuous Reception (DRX) for a UE to reduce power consumption, since the UE will not need to wake up all the time. It means that the UE will not need to monitor/decode Physical Sidelink Control Channel (PSCCH) and/or PSSCH in all sidelink slots. Preferably, the UE may monitor/decode PSCCH and/or PSSCH in sidelink active time. The UE may not monitor/decode PSCCH and/or PSSCH in sidelink non-active time. The DRX procedure in NR Uu may be considered to apply, with some modification, to NR sidelink. Preferably, if DRX cycle is introduced for sidelink and/or a DRX on-duration timer for sidelink is introduced, the sidelink active time of the UE may include the time while the DRX on-duration timer for sidelink is running. Preferably, if a DRX Inactivity timer for sidelink is introduced, the sidelink active time of the UE may include the time while the DRX Inactivity timer for sidelink is running. Preferably, if a DRX retransmission timer for sidelink is introduced, the sidelink active time of the UE may include the time while the DRX retransmission timer for sidelink is running. Preferably, the sidelink active time of the UE may include the time while any of the DRX on-duration timer for sidelink, the DRX Inactivity timer for sidelink, or the DRX retransmission timer for sidelink is running. Note that the sidelink DRX is performed from the receiver aspect of the UE.

Although sidelink DRX is able to reduce power consumption for a UE, it may mean that the UE will not monitor/decode PSCCH in sidelink non-active time. Accordingly, the UE will not receive PSCCH or Sidelink Control Information (SCI) from other UE(s) in the sidelink non-active time; thus, the UE cannot acquire sensing results in the sidelink non-active time.

Figure 13:
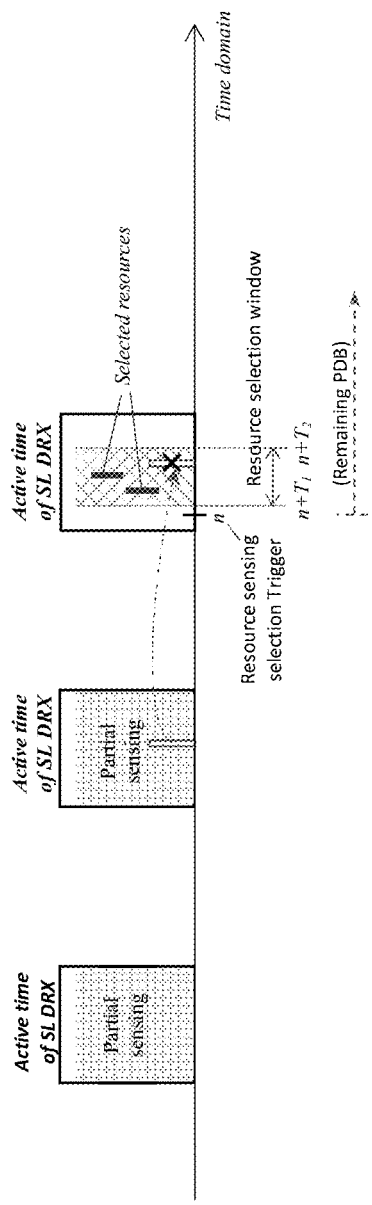
FIG. 13 shows a possible way for a UE to acquire sensing results in the sidelink non-active time by performing partial sensing in sidelink active time, in accordance with embodiments of the present invention.

One possible way is to perform partial sensing in sidelink active time is provided in the instance shown in FIG. 13. When the UE triggers resource sensing (and selection), e.g., in slot n, for a sidelink data, candidate resources in the associated resource selection window can be determined/restricted within sidelink active time. Note that the associated resource selection window, e.g., in time interval $[n+T_1, n+T_2]$, may be upper bounded based on remaining packet delay budget (PDB).

Moreover, exclusion of the candidate resources and/or generation of valid/identified resources in the associated resource selection window can be performed based on sensing results in previous one or multiple sidelink active times, e.g., the partial/periodic sensing results as shown in FIG. 13. For example, the UE may receive a SCI from other UE in previous sidelink active time, wherein the received SCI reserves one or more sidelink resources located in the associated resource selection window. More specifically, the received SCI may schedule/indicate sidelink transmission from the other UE for delivering/transmitting one Transport Block (TB), and the received SCI may reserve the one or more sidelink resource for another TB different from the one TB. Preferably, the received SCI may schedule/indicate the sidelink transmission for delivering/transmitting the one TB via "Frequency resource assignment" field and "Time resource assignment field". Preferably, the received SCI may reserve the one or more sidelink resource for the another TB via "Resource reservation period" field and/or "Frequency resource assignment" field and "Time resource assignment field". In this case, the UE may exclude candidate resource(s) (partially or fully) overlapped with the one or more sidelink resources reserved by the SCI received in previous sidelink active time. The UE may not generate valid/identified resource (partially or fully) overlapped with the one or more sidelink resources reserved by the SCI received in previous sidelink active time. Finally, the UE may select one or more sidelink resource(s) from the valid/identified resources, and then perform sidelink transmission(s) on the selected one or more sidelink resource(s).

The instance shown in FIG. 13 can deal with sensing results associated with resource reservation information of periodic sidelink data (e.g., the one TB and the another TB from the other UE). However, the UE may not acquire resource reservation information of aperiodic sidelink data (transmitted from other UEs). In current NR sidelink design, one SCI in slot m can schedule/indicate sidelink resource(s), for a same TB, up to slot m+31. Thus, there are some proposals (see e.g., [9]-[13]) to perform additional sensing for acquiring such resource reservation information of aperiodic sidelink data. Accordingly, exclusion of the candidate resources and/or generation of valid/identified resources can be performed based on partial/periodic sensing results and the additional sensing result.

Figure 14A:
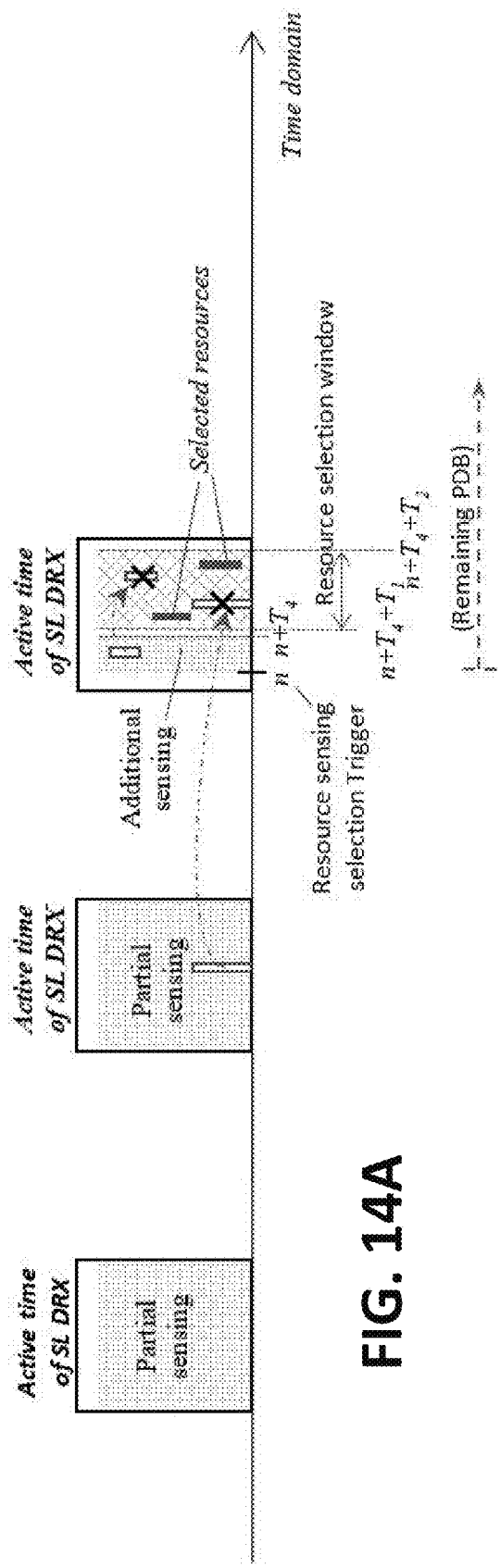
FIGS. 14A-14B shows a UE triggering resource sensing (and selection), e.g., in slot n, for a sidelink data, (starting to) perform additional sensing for an additional sensing duration, e.g., in a time interval, in accordance with embodiments of the present invention.
Figure 14B:
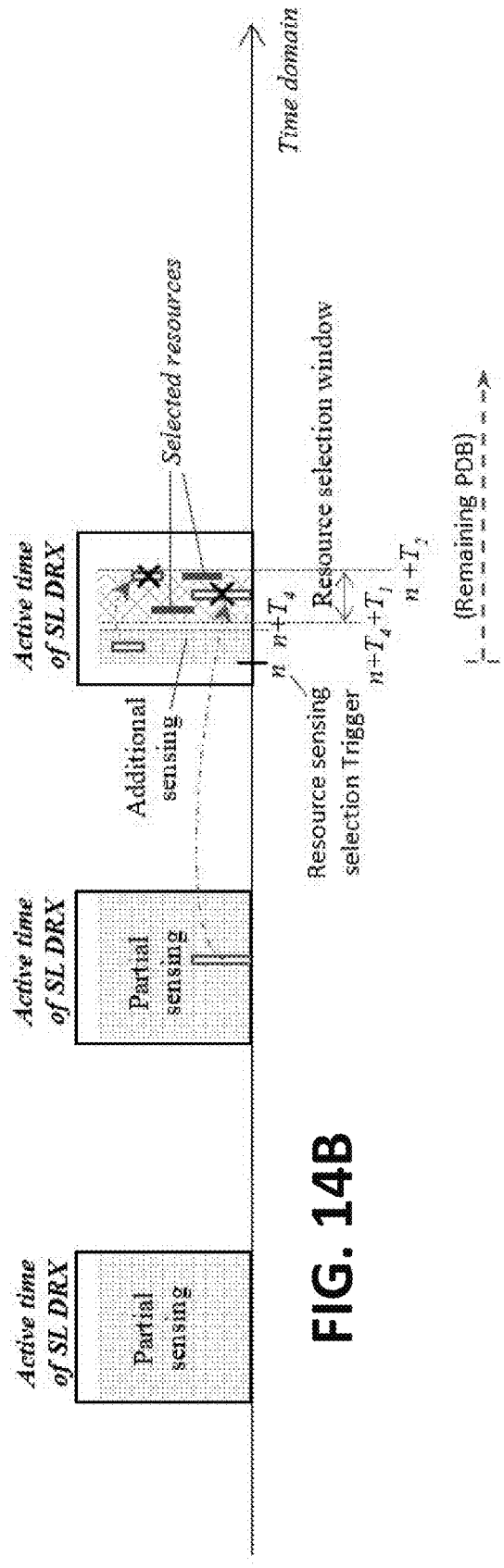

As shown in the instances of FIGS. 14A and 14B, when the UE triggers resource sensing (and selection), e.g., in slot n, for a sidelink data, the UE may (start to) perform additional sensing for an additional sensing duration, e.g., in a time interval [n, n+$T_4$] or (n, n+$T_4$], for acquiring resource reservation information from other UEs. More specifically, $T_4$ may be 31. The associated resource selection window may start after the additional sensing duration, e.g., in time interval [n+$T_4$+$T_1$, n+$T_4$+$T_2$] shown in FIG. 14A or in time interval [n+$T_4$+$T_1$, n+$T_2$] shown in FIG. 14B. Exclusion of the candidate resources and/or generation of valid/identified resources in the associated resource selection window can be performed based on sensing results in previous one or multiple sidelink active times and sensing results in the additional sensing duration.

For example, the UE may receive a SCI from other UE in the additional sensing duration, wherein the received SCI may schedule/indicate sidelink transmission(s) from the other UE in the associated resource selection window. More specifically, the received SCI may schedule/indicate sidelink resource(s) for the scheduled/indicated sidelink transmission(s) from the other UE.

Preferably, the received SCI may schedule/indicate the sidelink resource(s) via "Frequency resource assignment" field and "Time resource assignment field", and/or "Resource reservation period" field. In this case, the UE may exclude candidate resource(s) (partially or fully) overlapped with the sidelink resource(s) scheduled/indicated/reserved by the SCI received in the additional sensing duration. The UE may not generate valid/identified resource (partially or fully) overlapped with the sidelink resource(s) scheduled/indicated/reserved by the SCI received in the additional sensing duration. Finally, the UE may select one or more sidelink resources from the valid/identified resources, and then perform sidelink transmission(s) on the selected one or more sidelink resources.

However, the additional sensing design may induce some issues.

One issue is that when the UE triggers resource sensing and selection for a sidelink data, the additional sensing duration may induce latency, e.g., additional 31 slots, for delivering/transmitting the sidelink data. This issue is because the UE can select sidelink resource after the additional sensing duration.

Moreover, the additional sensing duration may induce restriction such that sidelink resources in the starting 32 slots of each sidelink active time are non-selectable or non-usable for the UE to perform sidelink transmission, since the UE can select sidelink resources after performing additional sensing duration. Such restriction will result in additional latency and inefficiency on resource utilization.

To address the referenced problems and issues, various embodiments, methods, systems, devices, and mechanisms are provided below.

Considering a UE may (keep/continue to) receive SCI during sidelink active time, it is possible that the UE already acquired some resource reservation information of (aperiodic) sidelink data (transmitted from other UEs) before the trigger of resource sensing (and selection). The concept of this method a is that time length of the additional sensing duration may be determined/derived based on how long the UE performs sensing before the UE triggers resource sensing (and selection). For an example of assuming 31 slots are required for additional sensing, if the UE performs sensing of 10 slots before the UE triggers resource sensing (and selection), (the time length of) the additional sensing duration after the UE triggers resource sensing (and selection) may be 21 (=31−10) slots. Moreover, if the UE operates sidelink DRX, how long the UE performs sensing may be derived as a number of slots between the starting slot of (present/current) sidelink active time and the slot of trigger of resource sensing (and selection).

For an example assuming 31 slots are required for additional sensing, if a sidelink active time for the UE is in slot [251, 320] and the UE triggers resource sensing and selection in slot 260, the UE may perform additional sensing in additional sensing duration [260, 281] or [260, 281], instead of [260, 290]. The UE may be able to select sidelink resources in slot x, wherein x≥282 or x≥(282+$T_1$), instead of x≥291. If the UE triggers resource sensing and selection in slot 285, the UE may select sidelink resources without need of performing additional sensing after the sidelink resource trigger. The UE may be able to select sidelink resources in slot x, wherein x≥285 or x≥(285+$T_1$), instead of x≥(285+ 31). In other words, the latency due to additional sensing duration can be possibly improved with consideration of sidelink DRX design.

An exemplary embodiment of the present invention comprises a first UE that may (trigger to) perform resource sensing (and selection) for determining a first sidelink resource, and then the first UE performs a first (control and/or data) sidelink transmission on the first sidelink resource for delivering/transmitting a sidelink data. Preferably in certain embodiments, the first UE may perform periodic-based partial sensing, to acquire resource reservation information from one or more other UEs, based on a set of (reservation) periods. Preferably in certain embodiments, the first UE may perform additional sensing, to acquire resource reservation information from one or more other UEs, for an additional sensing duration. The additional sensing duration may start after or when the first UE (triggers to) perform the sensing (and selection). If the first UE (already) receives/monitors SCI for a (contiguous) time duration before the first UE (triggers to) perform the sensing (and selection), the time length of the additional sensing duration may be determined/derived based on the time length of the (contiguous) time duration.

Preferably in certain embodiments, the time length of the additional sensing duration may be determined/derived as a specific value minus the time length of the (contiguous) time duration. Preferably in certain embodiments, the time length of the additional sensing duration may be the same as a derived value of a specific value minus the time length of the (contiguous) time duration.

Preferably in certain embodiments, the first UE may operate sidelink DRX. The first UE may receive/monitor SCI in sidelink active time. The sidelink active time may be determined/derived based on sidelink DRX configuration/parameters. Preferably in certain embodiments, the first UE may (trigger to) perform the resource sensing (and selection) in one sidelink active time. The (contiguous) time duration may start from a starting boundary of the one sidelink active time.

Preferably in certain embodiments, the (contiguous) time duration may start in a starting timing of the one sidelink active time. Preferably in certain embodiments, the (contiguous) time duration/interval may mean/comprise a time duration/interval starting in a starting timing of the one sidelink active time and ending in a timing when the first UE (triggers to) perform the resource sensing (and selection). Preferably or alternatively in certain embodiments, the (contiguous) time duration/interval may mean/comprise a time duration/interval starting in a starting timing of the one sidelink active time and ending in a timing which is one slot before the first UE (triggers to) perform the resource sensing (and selection).

Preferably in certain embodiments, the time length of the additional sensing duration may be zero. Preferably in certain embodiments, the time length of the additional sensing duration may be zero, if the time length of the (contiguous) time duration is larger than or equal to the specific value. Preferably in certain embodiments, the time length of the additional sensing duration as zero may mean that the first UE does not (need to) perform the additional sensing (for at least the sidelink data/one TB/one Medium Access Control (MAC) Protocol Data Unit (PDU)) after or when the first UE (triggers to) perform the resource sensing (and selection) (for at least the sidelink data/one TB/one MAC PDU). In other words, if the time length of the (contiguous) time duration is larger than or equal to the specific value, the first UE does not (need to) perform the additional sensing after or when the first UE (triggers to) perform the resource sensing (and selection). Preferably in certain embodiments, if the time length of the (contiguous) time duration is larger than or equal to the specific value, the first UE selects the first sidelink resource based on at least sensing result before the first UE (triggers to) perform the resource sensing (and selection). In other words, if the time length of the (contiguous) time duration is larger than or equal to the specific value, the first UE selects the first sidelink resource without considering sensing result after the first UE (triggers to) perform the resource sensing (and selection). If the time length of the (contiguous) time duration is less than the specific value, the first UE (need to) performs the additional sensing for an additional sensing duration (which time length is non-zero) (for at least the sidelink data/one TB/one MAC PDU) after or when the first UE (triggers to) perform the sensing (and selection). In other words, the first UE (triggers to) perform the resource sensing (and selection) (for at least the sidelink data/one TB/one MAC PDU) at a timing in the one sidelink active time.

If the time gap between the timing and starting boundary/timing of the one sidelink active time is larger than or equal to the specific value, the first UE does not (need to) perform the additional sensing (for at least the sidelink data/one TB/one MAC PDU) after or when the first UE (triggers to) perform the resource sensing (and selection). If the time gap between the timing and starting boundary/timing of the one sidelink active time is less than the specific value, the first UE (needs to) performs the additional sensing for an additional sensing duration (which time length is non-zero) after or when the first UE (triggers to) perform the resource sensing (and selection). Preferably in certain embodiments, the time gap between the timing and starting boundary/timing of the one sidelink active time is counted or derived in units of slot.

Figure 15A:
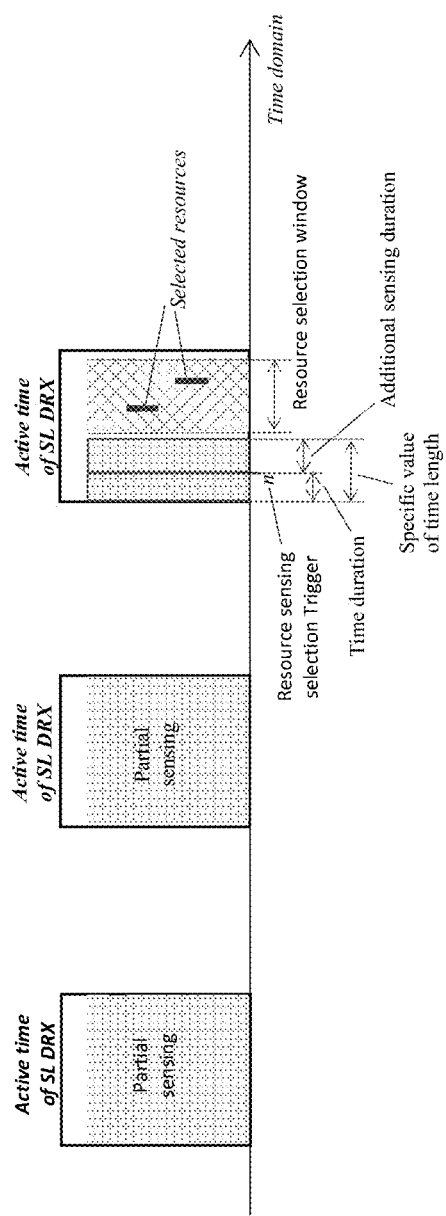
FIG. 15A shows a case where the time length of the (contiguous) time duration is less than the specific value or time gap between the timing of (triggering to) performing the resource sensing (and selection) and starting boundary/timing of the one sidelink active time is less than the specific value, in accordance with embodiments of the present invention.
Figure 15B:
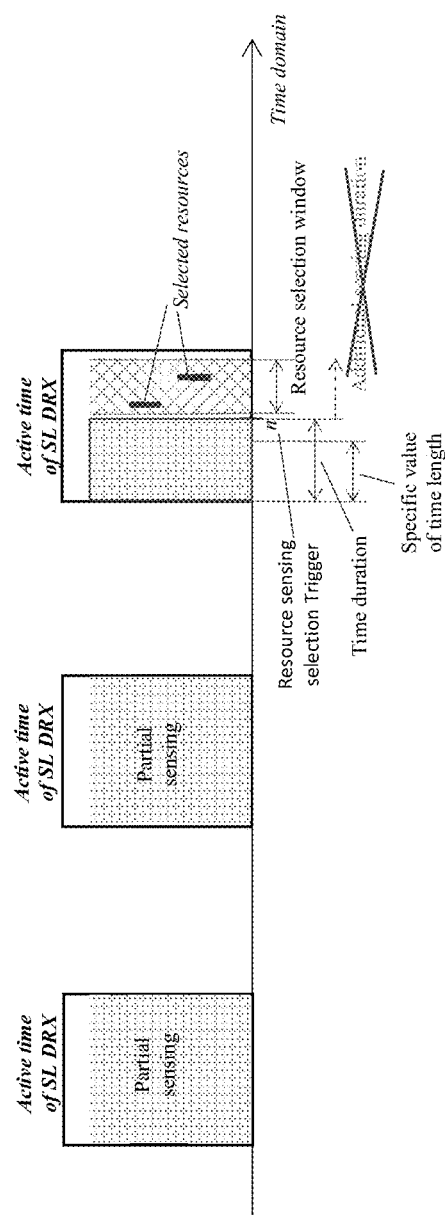
FIG. 15B shows a case where the time length of the (contiguous) time duration is larger than the specific value or time gap between the timing of (triggering to) performing the resource sensing (and selection) and starting boundary/timing of the one sidelink active time is larger than the specific value, in accordance with embodiments of the present invention.

For instances, FIG. 15A shows a case that the time length of the (contiguous) time duration is less than the specific value or time gap between the timing of (triggering to) performing the resource sensing (and selection) and starting boundary/timing of the one sidelink active time is less than the specific value. FIG. 15B shows a case that the time length of the (contiguous) time duration is larger than the specific value or time gap between the timing of (triggering to) performing the resource sensing (and selection) and starting boundary/timing of the one sidelink active time is larger than the specific value.

Preferably in certain embodiments, the first UE may not always receive/monitor SCI in the (contiguous) time duration. Preferably in certain embodiments, the first UE may receive/monitor SCI in one slot of the (contiguous) time duration, when/if the first UE does not perform sidelink (control and/or data) transmission in the one slot. Preferably in certain embodiments, when/if the first UE performs sidelink (control and/or data) transmission in one slot of the (contiguous) time duration, the first UE may not receive/monitor SCI in the one slot.

Preferably in certain embodiments, the specific value may be 31. Preferably or alternatively in certain embodiments, the specific value may be 32.

Preferably or alternatively in certain embodiments, the specific value may be $(31+T_1)$, or ceiling function of $(31+T_1)$.

Preferably or alternatively in certain embodiments, the specific value may be $(32+T_1)$, or ceiling function of $(32+T_1)$.

Preferably in certain embodiments, the specific value may be a (pre-)configured value. Preferably in certain embodiments, the specific value may be a specified value.

Preferably in certain embodiments, the first UE may perform the sidelink DRX and/or the additional sensing in a sidelink resource pool. Preferably in certain embodiments, the specific value may be determined based on Channel Busy Ratio (CBR) of the sidelink resource pool. For example, the specific value may be determined as a smaller value if CBR of the sidelink resource pool is lower than a CBR threshold. The specific value may be determined as a larger value if CBR of the sidelink resource pool is larger than the CBR threshold. Alternatively, the specific value may be determined as a larger value if CBR of the sidelink resource pool is lower than a CBR threshold. The specific value may be determined as a smaller value if CBR of the sidelink resource pool is larger than the CBR threshold Preferably in certain embodiments, the specific value may be determined based on a data priority of the sidelink data. For example, the specific value may be determined as a smaller value if data priority of the sidelink data is lower than a priority threshold. The specific value may be determined as a larger value if data priority of the sidelink data is higher than the priority threshold. Alternatively, the specific value may be determined as a larger value if data priority of the sidelink data is lower than a priority threshold. The specific value may be determined as a smaller value if data priority of the sidelink data is higher than the priority threshold.

Preferably in certain embodiments, the specific value may be determined based on a latency requirement or (remaining) PDB of the sidelink data. For example, the specific value may be determined as a smaller value if latency requirement or (remaining) PDB of the sidelink data is shorter than a time threshold. The specific value may be determined as a larger value if latency requirement or (remaining) PDB of the sidelink data is larger than the time threshold. Alternatively, the specific value may be determined as a larger value if latency requirement or (remaining) PDB of the sidelink data is shorter than a time threshold. The specific value may be determined as a smaller value if latency requirement or (remaining) PDB of the sidelink data is larger than the time threshold.

Preferably in certain embodiments, for additional sensing in sidelink active time, the first UE may receive/monitor 1st stage SCI and/or $2^{nd}$ stage SCI. The first UE may receive/monitor SCI format 1 and/or SCI format 2-A/2-B. The first UE may receive/monitor PSCCH for SCI format 1. The first UE may receive/decode PSSCH for receiving SCI format 2-A/2-B.

Figure 16:
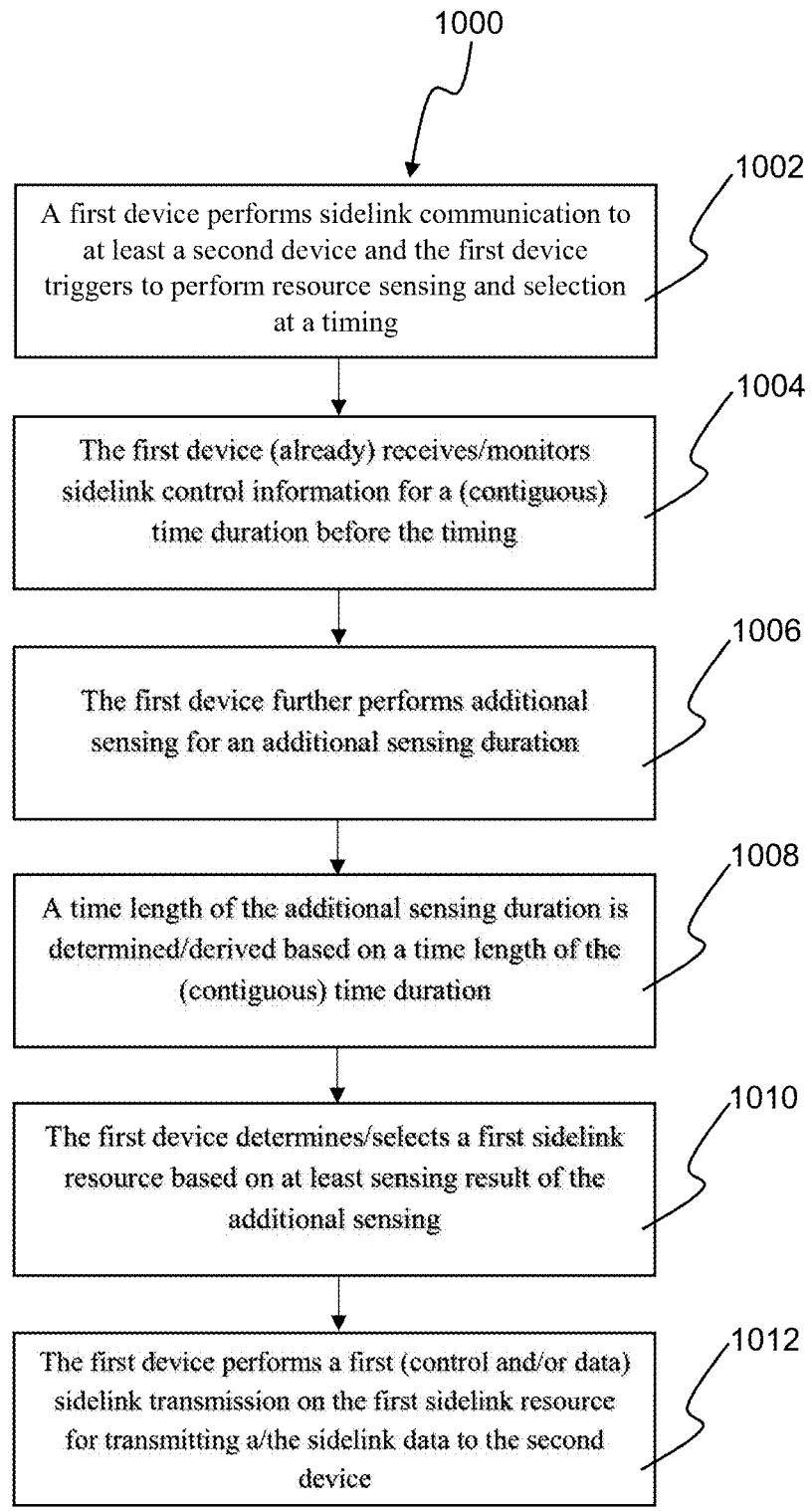
FIG. 16 is a flow diagram of a method of a first device performing sidelink communication to at least a second device, in accordance with embodiments of the present invention.

Referring to FIG. 16, with this and other concepts and methods of the present invention, a method 1000 of a first device performs sidelink communication to at least a second device and comprises the steps where the first device triggers to perform resource sensing and selection (for sidelink data/at least one TB/at least one MAC PDU) at a timing, at step 1002, wherein the first device (already) receives/monitors sidelink control information for a (contiguous) time duration before the timing, at step 1004. The first device further performs additional sensing for an additional sensing duration, at step 1006, wherein a time length of the additional sensing duration is determined/derived based on a time length of the (contiguous) time duration, at step 1008. The first device determines/selects a first sidelink resource based on at least sensing result of the additional sensing, at step 1010, and the first device performs a first (control and/or data) sidelink transmission on the first sidelink resource for transmitting a/the sidelink data to the second device, at step 1012.

In certain embodiments, the time length of the additional sensing duration is determined/derived as a specific value minus the time length of the (contiguous) time duration.

In certain embodiments, if the time length of the (contiguous) time duration is less than the specific value, the first device performs the additional sensing (for the sidelink data/the at least one TB/the at least one MAC PDU), for the additional sensing duration, after the timing.

In certain embodiments, if the time length of the (contiguous) time duration is larger than the specific value, the first device does not perform the additional sensing after the timing (for the sidelink data/the at least one TB/the at least one MAC PDU), and/or the first device does not determine/select the first sidelink resource based on sensing result after the timing.

In certain embodiments, the first device further performs sidelink DRX procedure. The first device receives/monitors SCI in sidelink active time, wherein the sidelink active time is determined/derived based on sidelink DRX configuration/parameters. The first device triggers to perform the resource sensing and selection in one sidelink active time.

In certain embodiments, the (contiguous) time duration starts in a starting boundary/timing of the one sidelink active time.

In certain embodiments, the (contiguous) time interval means/comprises a time interval starting in a starting timing of the one sidelink active time and ending in the timing.

In certain embodiments, the specific value is 31 or 32.

In certain embodiments, the specific value is $(31+T_1)$, or a ceiling function of $(31+T_1)$.

In certain embodiments, the specific value is (pre-)configured or specified.

In certain embodiments, the first device performs the additional sensing in a sidelink resource pool, and/or the specific value is determined based on CBR of the sidelink resource pool.

In certain embodiments, the specific value is determined based on a data priority of the sidelink data.

In certain embodiments, the specific value is determined based on a latency requirement or (remaining) PDB of the sidelink data.

Referring back to FIGS. 3 and 4, in one or more embodiments, the device 300 includes program code 312 stored in memory 310. The CPU 308 could execute program code 312 to: (i) perform, at a first device, sidelink communication to at least a second device and the first device triggers to perform resource sensing and selection at a timing, (ii) receive/monitor, at the first device, sidelink control information for a (contiguous) time duration before the timing, (iii) wherein the first device further performs additional sensing for an additional sensing duration, (iv) wherein a time length of the additional sensing duration is determined/derived based on a time length of the (contiguous) time duration, and (v) determine/select, at the first device, a first sidelink resource based on at least sensing result of the additional sensing, and (vi) perform, at the first device, a first (control and/or data) sidelink transmission on the first sidelink resource for transmitting a/the sidelink data to the second device. Moreover, the CPU 308 can execute the program code 312 to perform all of the described actions, steps, and methods described above, below, or otherwise herein.

Figure 17:
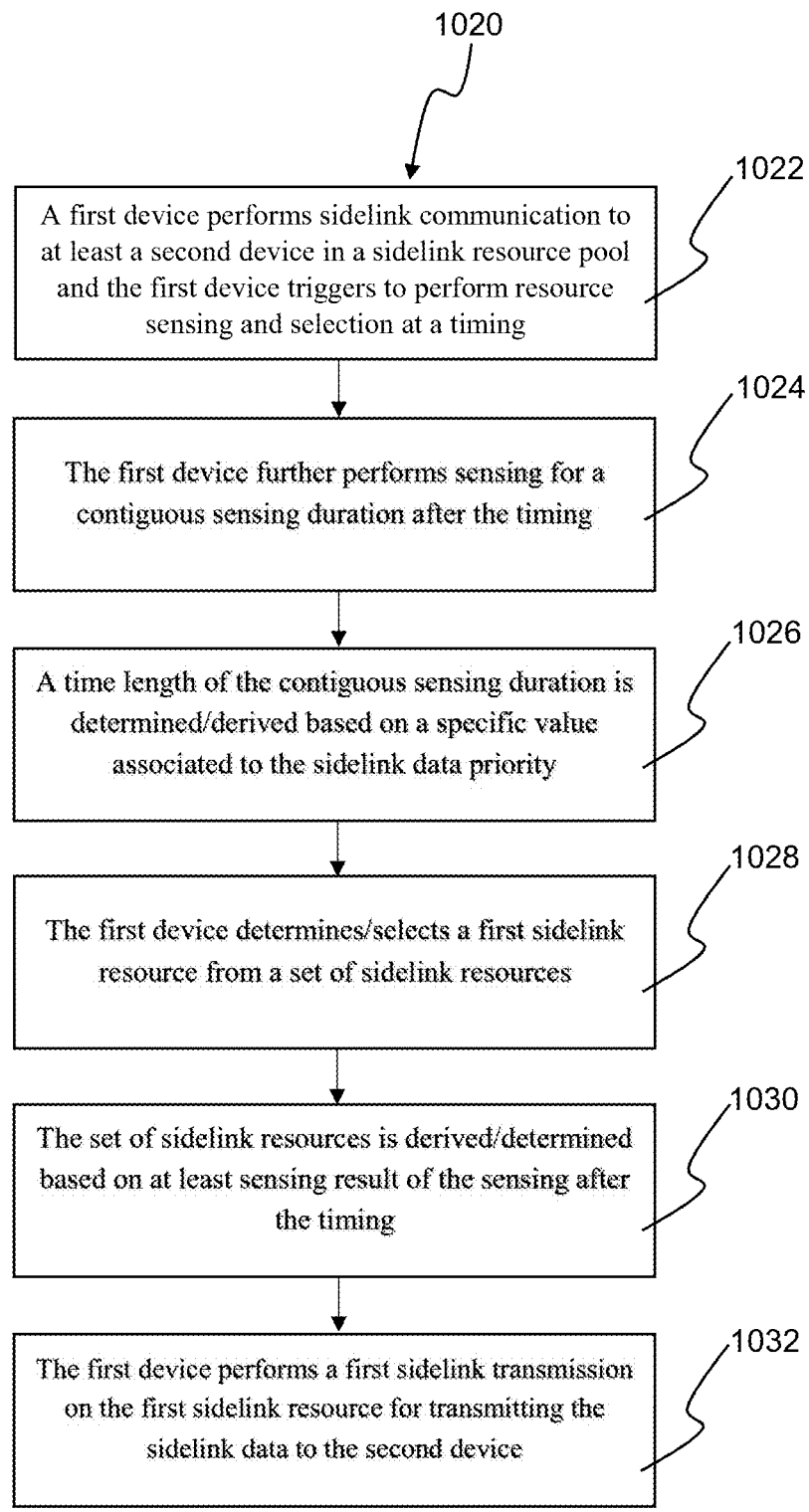
FIG. 17 is a flow diagram of a method of a first device performing sidelink communication to at least a second device in a sidelink resource pool, in accordance with embodiments of the present invention.

Referring to FIG. 17, with this and other concepts and methods of the present invention, a method 1020 of a first device performs sidelink communication to at least a second device in a sidelink resource pool and comprises the steps where the first device triggers to perform resource selection for a sidelink data at a timing, at step 1022. The first device further performs sensing for a contiguous sensing duration after the timing at step 1024, wherein a time length of the contiguous sensing duration is determined/derived based on a specific value associated to the sidelink data priority, at step 1026. The first device determines/selects a first sidelink resource from a set of sidelink resources at step 1028, wherein the set of sidelink resources is derived or determined based on at least sensing result of the sensing after the timing, at step 1030. The first device performs a first sidelink transmission on the first sidelink resource for transmitting the sidelink data to the second device, at step 1032.

In certain embodiments, the first device is (pre-)configured with association between one or more specific values for contiguous sensing duration and one or more sidelink data priority, respectively.

In certain embodiments, the first device performs partial sensing before the timing, and/or the performing sensing for the contiguous sensing duration is in response to the triggering to perform resource selection for the sidelink data.

In certain embodiments, the set of sidelink resources is derived or determined based on the sensing result of the sensing after the timing and sensing result of the partial sensing before the timing.

In certain embodiments, wherein the timing is (in) a sidelink TTI in the sidelink resource pool, and/or the contiguous sensing duration consists of sidelink TTIs in the sidelink resource pool.

In certain embodiments, the contiguous sensing duration starts in the timing or at ending of the timing, or the contiguous sensing duration is just after the timing, and/or In certain embodiments, the contiguous sensing duration ends before a first candidate slot associated with partial sensing.

In certain embodiments, the specific value is in unit of sidelink TTI (in the sidelink resource pool).

Referring back to FIGS. 3 and 4, in one or more embodiments, the device 300 includes program code 312 stored in memory 310. The CPU 308 could execute program code 312 to: (i) perform, at a first device, sidelink communication to at least a second device and the first device triggers to perform resource sensing and selection at a timing, (ii) sense, at the first device, for a contiguous sensing duration after the timing, (iii) wherein a time length of the contiguous sensing duration is determined/derived based on a specific value associated to the sidelink data priority, (iv) determine/select, by the first device, a first sidelink resource from a set of sidelink resources, (v) wherein the set of sidelink resources is derived/determined based on at least sensing result of the sensing after the timing, and (vi) perform, by the first device, a first sidelink transmission on the first sidelink resource for transmitting the sidelink data to the second device. Moreover, the CPU 308 can execute the program code 312 to perform all of the described actions, steps, and methods described above, below, or otherwise herein.

Figure 18:
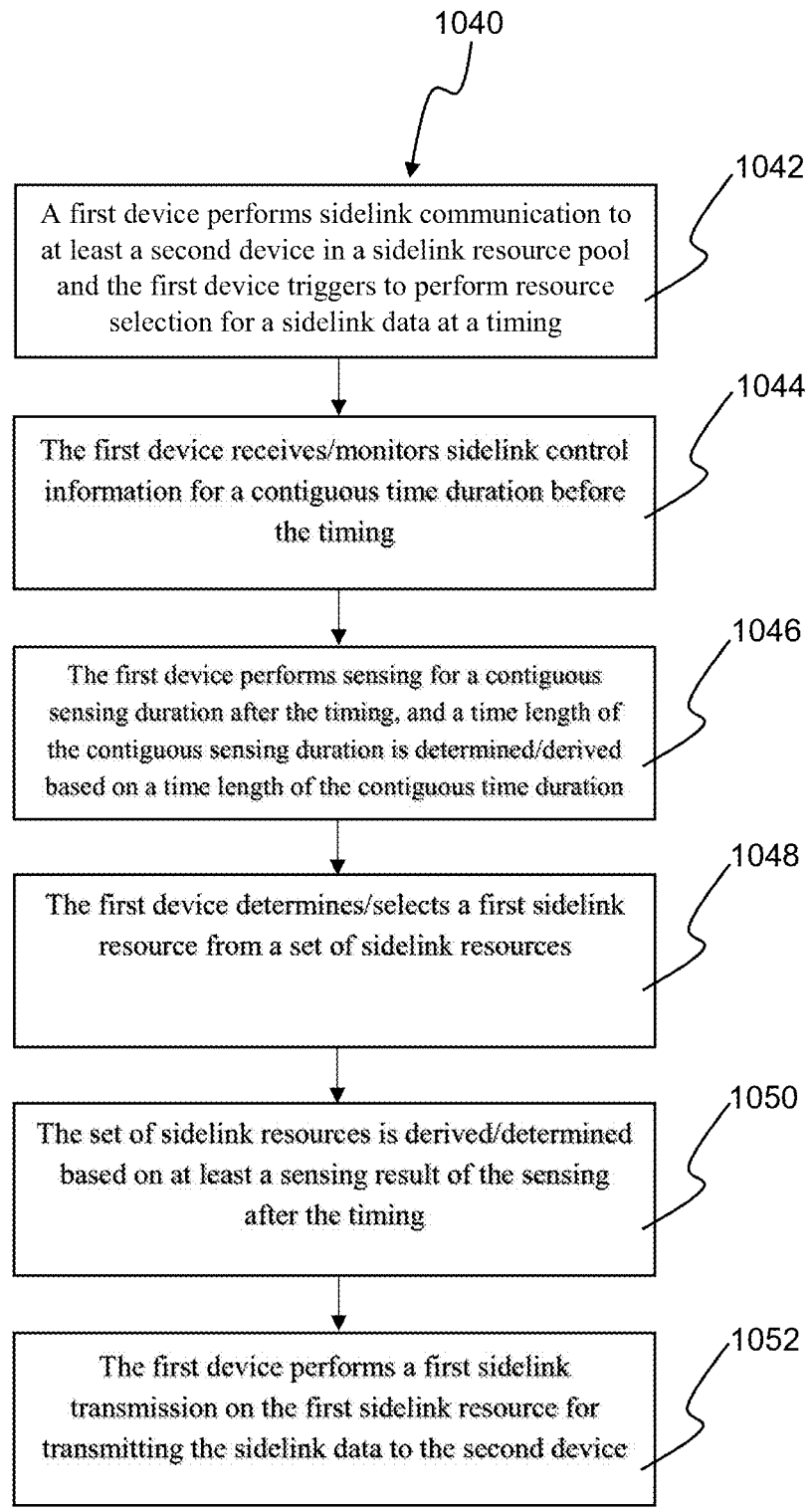
FIG. 18 is a flow diagram of a method of a first device performing sidelink communication to at least a second device in a sidelink resource pool, in accordance with embodiments of the present invention.

Referring to FIG. 18, with this and other concepts and methods of the present invention, a method 1040 of a first device performs sidelink communication to at least a second device in a sidelink resource pool and comprises the steps where the first device triggers to perform resource selection, for a sidelink data, at a timing, at step 1042. The first device (already) receives/monitors sidelink control information for a (contiguous) time duration before the timing, at step 1044. At step 1046, the first device performs sensing for a contiguous sensing duration after the timing, wherein a time length of the contiguous sensing duration is determined/derived based on a time length of the (contiguous) time duration. The first device determines/selects a first sidelink resource from a set of sidelink resources, at step 1048, with the set of sidelink resources derived/determined based on at least a sensing result of the sensing after the timing, at step 1050. The first device performs a first sidelink transmission on the first sidelink resource for transmitting the sidelink data to the second device, at step 1052.

In certain embodiments, the set of sidelink resources is derived or determined based on the sensing result of the sensing after the timing and receiving/monitoring result within the (contiguous) time duration.

In certain embodiments, the time length of the contiguous sensing duration is determined or derived based on a specific value and the time length of the (contiguous) time duration, and/or the time length of the contiguous sensing duration is the same as the specific value minus the time length of the (contiguous) time duration.

In certain embodiments, if the time length of the (contiguous) time duration is less than the specific value, the first device performs the sensing for the contiguous sensing duration after the timing, and/or if the time length of the (contiguous) time duration is larger than the specific value, the first device does not perform the sensing after the timing for the sidelink data.

In certain embodiments, the specific value is 31, 32, (pre-)configured or specified, and/or the specific value is determined based on a data priority of the sidelink data, and/or the specific value is determined based on a latency requirement or remaining packet delay budget of the sidelink data, and/or the specific value is determined based on a CBR of the sidelink resource pool, and/or the specific value is in a unit of TTI.

In certain embodiments, the timing is in a sidelink on-duration active time of at least one sidelink DRX cycle, and/or the (contiguous) time duration is in the sidelink on-duration active time, and/or the (contiguous) time duration starts in a starting boundary or timing of the sidelink on-duration active time, and/or the (contiguous) time duration ends during the timing or at a beginning of the timing, or the (contiguous) time duration is immediately before the timing, and/or the contiguous sensing duration starts during the timing or at an ending of the timing, or the contiguous sensing duration is immediately after the timing, and/or performing sensing for the contiguous sensing duration is in response to the triggering to perform resource selection for the sidelink data.

In certain embodiments, the timing is in a sidelink TTI in the sidelink resource pool, and/or the (contiguous) time duration consists of sidelink TTIs in the sidelink resource pool, and/or the contiguous sensing duration comprises sidelink TTIs in the sidelink resource pool.

Referring back to FIGS. 3 and 4, in one or more embodiments, the device 300 includes program code 312 stored in memory 310. The CPU 308 could execute program code 312 to: (i) perform, at a first device, sidelink communication to at least a second device and the first device triggers to perform resource selection, for a sidelink data, at a timing, (ii) (already) receive/monitor, at the first device, sidelink control information for a (contiguous) time duration before the timing, (iii) perform, at the first device, sensing for a contiguous sensing duration after the timing, and a time length of the contiguous sensing duration is determined/derived based on a time length of the (contiguous) time duration, (iv) wherein the first device determines/selects a first sidelink resource from a set of sidelink resources, (v) wherein the set of sidelink resources is derived/determined based on at least a sensing result of the sensing after the timing, and (vi) perform, by the first device, a first sidelink transmission on the first sidelink resource for transmitting the sidelink data to the second device. Moreover, the CPU 308 can execute the program code 312 to perform all of the described actions, steps, and methods described above, below, or otherwise herein.

Figure 19:
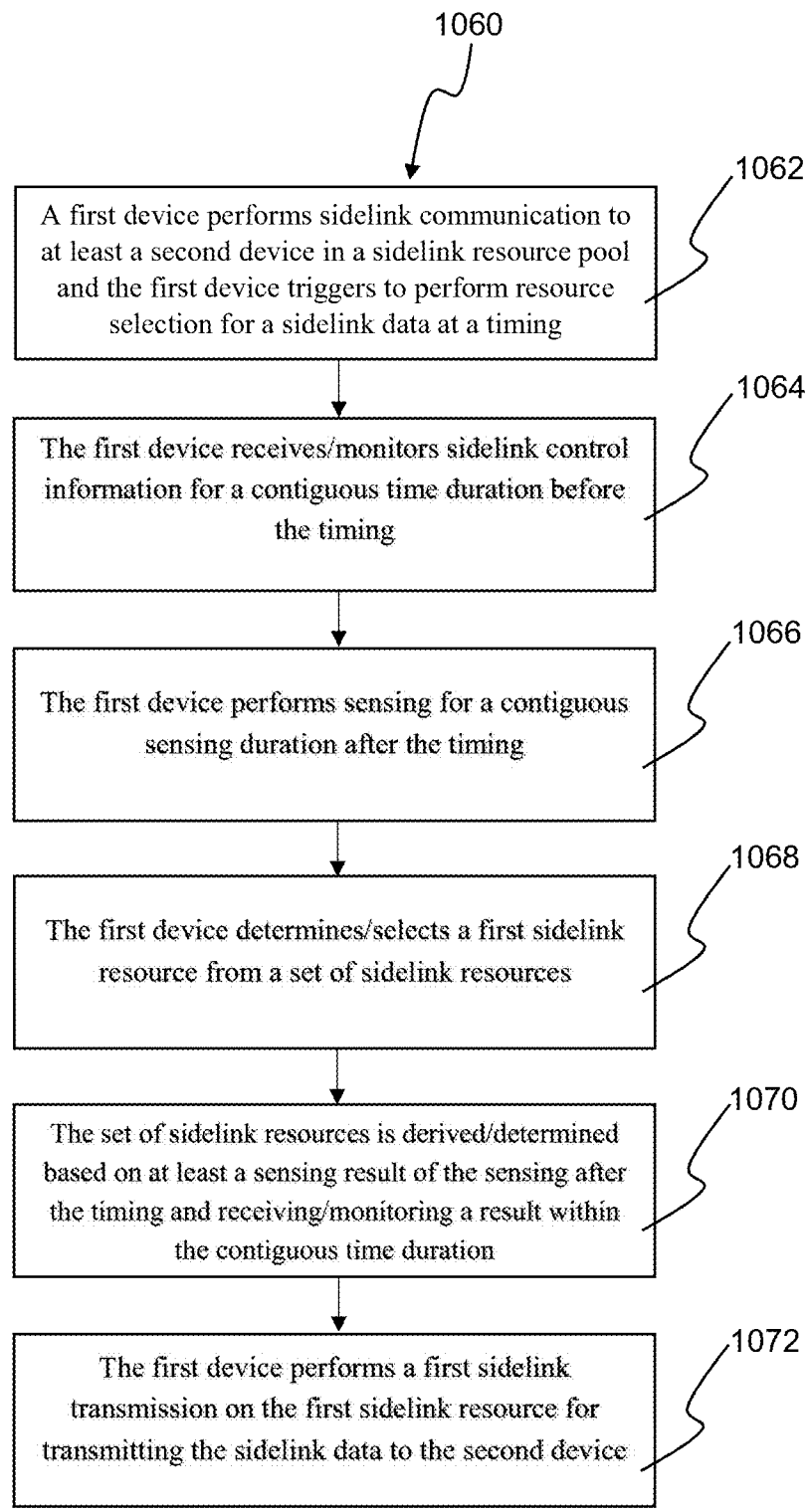
FIG. 19 is a flow diagram of a method of a first device performing sidelink communication to at least a second device in a sidelink resource pool, in accordance with embodiments of the present invention.

Referring to FIG. 19, with this and other concepts and methods of the present invention, a method 1060 of a first device performs sidelink communication to at least a second device in a sidelink resource pool and comprises the steps where the first device triggers to perform resource selection, for a sidelink data, at a timing, at step 1062. The first device (already) receives/monitors sidelink control information for a (contiguous) time duration before the timing, at step 1064. At step 1066, the first device performs sensing for a contiguous sensing duration after the timing. The first device determines/selects a first sidelink resource from a set of sidelink resources, at step 1068. The set of sidelink resources is derived/determined based on at least a sensing result of the sensing after the timing and receiving/monitoring result within the (contiguous) time duration, at step 1070. The first device performs a first sidelink transmission on the first sidelink resource for transmitting the sidelink data to the second device, at step 1052.

In certain embodiments, the set of sidelink resources is derived or determined at least based on a sensing result of a specific value of slots, wherein the specific value of slots comprises all slots in the contiguous sensing duration and all or a latter part of contiguous slots in the (contiguous) time duration, and/or the sensing result of the all or latter part of the contiguous slots in the (contiguous) time duration means receiving/monitoring result of the all or the latter part of the contiguous slots in the (contiguous) time duration.

In certain embodiments, a time length of the contiguous sensing duration is determined or derived based on the specific value and time length of the all or the latter part of the contiguous slots in the (contiguous) time duration.

In certain embodiments, the specific value is 31, 32, (pre-)configured or specified, and/or the specific value is determined based on a data priority of the sidelink data, and/or the specific value is determined based on a latency requirement or remaining packet delay budget of the sidelink data, and/or the specific value is determined based on a CBR of the sidelink resource pool, and/or the specific value is in a unit of sidelink TTI.

In certain embodiments, the timing is in a sidelink on-duration active time of one sidelink DRX cycle, and/or the (contiguous) time duration is in the sidelink on-duration active time, and/or the (contiguous) time duration starts in a starting boundary/timing of the sidelink on-duration active time, and/or the (contiguous) time duration ends in the timing or at beginning of the timing, or the (contiguous) time duration is immediately before the timing, and/or the contiguous sensing duration starts in the timing or at ending of the timing, or the contiguous sensing duration is immediately after the timing, and/or the performing sensing for the contiguous sensing duration is in response to the triggering to perform resource selection for the sidelink data.

In certain embodiments, the timing is in a sidelink TTI in the sidelink resource pool, and/or the (contiguous) time duration consists of sidelink TTIs in the sidelink resource pool, and/or the contiguous sensing duration consists of sidelink TTIs in the sidelink resource pool.

Referring back to FIGS. 3 and 4, in one or more embodiments, the device 300 includes program code 312 stored in memory 310. The CPU 308 could execute program code 312 to: (i) perform, at a first device, sidelink communication to at least a second device in a sidelink resource pool and the first device triggers to perform resource selection, for a sidelink data, at a timing, (ii) (already) receive/monitor, at the first device, sidelink control information for a (contiguous) time duration before the timing, (iii) perform, at the first device, sensing for a contiguous sensing duration after the timing, (iv) determine/select, at the first device, a first sidelink resource from a set of sidelink resources, (v) wherein the set of sidelink resources is derived/determined based on at least a sensing result of the sensing after the timing and receiving/monitoring result within the (contiguous) time duration, and (vi) perform, by the first device, a first sidelink transmission on the first sidelink resource for transmitting the sidelink data to the second device. Moreover, the CPU 308 can execute the program code 312 to perform all of the described actions, steps, and methods described above, below, or otherwise herein.

Any combination of the above concepts or teachings can be jointly combined or formed to one or more new embodiments. The disclosed details and embodiments provided below can be used to solve at least (but not limited to) the issues mentioned above and herein.

Preferably in certain embodiments, the starting boundary/timing of one sidelink active time may be the starting slot boundary/starting slot timing of the one sidelink active time.

Preferably in certain embodiments, the starting boundary/timing of one sidelink active time may be the starting symbol boundary/starting symbol timing of the one sidelink active time. Preferably in certain embodiments, the symbol is a first symbol available for sidelink transmission in a slot.

Preferably in certain embodiments, the first UE may (triggers to) perform the resource sensing (and selection), when/if the first UE requires sidelink resource for delivering/transmitting the sidelink data. Preferably in certain embodiments, the first sidelink (control and/or data) transmission is a new/initial sidelink transmission of the sidelink data. Preferably in certain embodiments, the first sidelink (control and/or data) transmission is a sidelink retransmission of the sidelink data.

Preferably in certain embodiments, the sidelink data may mean a TB. Preferably in certain embodiments, the transport block may mean/be a MAC PDU.

Preferably in certain embodiments, the aperiodic sidelink data may mean a transport block, wherein a "Resource reservation period" field in SCI scheduling the transport block indicates zero value of reservation period.

Preferably in certain embodiments, the periodic sidelink data may mean a transport block, wherein a "Resource reservation period" field in SCI scheduling the transport block indicates non-zero value of reservation period.

Preferably in certain embodiments, the time unit of the additional sensing duration may be a slot.

Preferably in certain embodiments, the time unit of the (contiguous) time interval may be a slot.

Preferably in certain embodiments, the slot may mean sidelink slot.

Preferably in certain embodiments, the first UE may perform the resource sensing (and selection) in a sidelink resource pool. Preferably in certain embodiments, the first UE may perform the additional sensing in the sidelink resource pool. Preferably in certain embodiments, the first UE may perform the sidelink DRX in the sidelink resource pool. Preferably in certain embodiments, the slot may mean/comprise sidelink slot associated with the sidelink resource pool. Preferably in certain embodiments, the slot may not mean/comprise sidelink slot associated with other sidelink resource pool.

Preferably in certain embodiments, the contiguous slots in the sidelink resource pool may be not contiguous in the physical slot. It means that the contiguous slots in the sidelink resource pool may be not contiguous from the aspect of the physical slot. Preferably in certain embodiments, the contiguous slots in the sidelink resource pool may be not contiguous in sidelink slots in a carrier/cell. It means that the contiguous slots in the sidelink resource pool may be not contiguous from the aspect of sidelink slots in a carrier/cell. Preferably in certain embodiments, there may be one or more sidelink resource pools in a carrier/cell.

Preferably in certain embodiments, the additional sensing may mean/comprise short sensing before performing the resource selection or before a resource selection window. Preferably in certain embodiments, the additional sensing may mean/comprise short sensing before candidate resources for the resource sensing and selection.

Preferably in certain embodiments, the additional sensing may mean/comprise sensing for a time duration before candidate resources for the resource sensing and selection.

Preferably in certain embodiments, the additional sensing may mean/comprise contiguous sensing. Preferably in certain embodiments, the additional sensing in the additional sensing duration may mean/comprise contiguous sensing at least in the (contiguous) additional sensing duration. Preferably in certain embodiments, the additional sensing does not mean periodic-based partial sensing. Preferably in certain embodiments, the additional sensing does not mean sensing based on reservation periods.

Preferably in certain embodiments, the partial sensing may mean/comprise periodic-based periodic sensing and/or additional sensing. Preferably in certain embodiments, the partial sensing may mean/comprise periodic-based periodic sensing and/or contiguous sensing. Preferably in certain embodiments, the periodic-based partial sensing may mean/comprise sensing based on the set of (reservation) periods. Preferably in certain embodiments, the periodic-based partial sensing may mean/comprise sensing on slots/resources associated with candidate resources for the resource sensing and selection, where the association is based on the set of (reservation) periods. Preferably in certain embodiments, the set of (reservation) periods is (pre-)configured. Preferably in certain embodiments, the set of (reservation) periods is (pre-)configured for the first UE.

Preferably in certain embodiments, the set of (reservation) periods is (pre-)configured for the sidelink resource pool. Preferably in certain embodiments, the set of (reservation) periods is specified. Preferably in certain embodiments, the set of (reservation) periods may be/comprise all or part of supported reservation periods in the sidelink resource pool. Preferably in certain embodiments, the set of (reservation) periods may be/comprise reservation periods with a period value larger than the specific value. Preferably in certain embodiments, the set of (reservation) periods may be/comprise reservation periods with a period value larger than the specific value. It means the set of (reservation) periods for periodic-based partial sensing may be/comprise some reservation periods, which are not covered in additional sensing (duration). It is because the resource reservation information for sidelink data with reservation period value smaller than specific value may be acquired via additional sensing. Preferably in certain embodiments, the (reservation) period value may be in unit of milliseconds. Preferably in certain embodiments, for comparing with the specific value, the (reservation) period value may be (converted/changed) in unit of slots.

Preferably in certain embodiments, the set of (reservation) periods may be determined/derived based on sidelink DRX configuration. Preferably in certain embodiments, the set of (reservation) periods may be determined/derived based on sidelink DRX cycle and/or on-duration timer.

Preferably in certain embodiments, the first UE acquires resource reservation information from the one or more other UEs via received SCI from the one or more other UEs. Preferably in certain embodiments, the SCI from the one or more other UEs includes resource reservation information of the other UE.

Preferably in certain embodiments, the sidelink data is for a second UE. Preferably in certain embodiments, the first UE performs the first (control and/or data) sidelink transmission on the first sidelink resource for delivering/transmitting the sidelink data to the second UE.

Preferably in certain embodiments, the first UE may have/maintain/establish a sidelink link/connection with the second UE on PC5 interface. Preferably in certain embodiments, the sidelink DRX is performed/operated for sidelink communication between the first UE and the second UE. Preferably in certain embodiments, the sidelink DRX configuration is configured for the sidelink link/connection between the first UE and the second UE. Preferably in certain embodiments, the sidelink DRX configuration is configured for the first UE. Preferably or alternatively in certain embodiments, the sidelink DRX configuration is configured for the second UE.

Preferably in certain embodiments, the sidelink active time, associated with the additional sensing, is associated/derived/determined based on sidelink DRX configuration for the sidelink link/connection between the first UE and the second UE. Preferably in certain embodiments, the sidelink active time, associated with the additional sensing, is associated/derived/determined based on sidelink DRX configuration for the second UE. Preferably or alternatively in certain embodiments, the sidelink active time, associated with the additional sensing, is associated/derived/determined based on sidelink DRX configuration for the first UE.

Preferably in certain embodiments, the sidelink active time, associated with the partial sensing, is associated/derived/determined based on sidelink DRX configuration for the sidelink link/connection between the first UE and the second UE. Preferably in certain embodiments, the sidelink active time, associated with the partial sensing, is associated/derived/determined based on sidelink DRX configuration for the second UE. Preferably or alternatively in certain embodiments, the sidelink active time, associated with the partial sensing, is associated/derived/determined based on sidelink DRX configuration for the first UE.

In one embodiment, the sidelink active time, associated with the additional sensing, is associated/derived/determined based on sidelink DRX configuration for the sidelink link/connection between the first UE and the second UE. The sidelink active time, associated with the partial sensing, is associated/derived/determined based on sidelink DRX configuration for the sidelink link/connection between the first UE and the second UE.

In one embodiment, the sidelink active time, associated with the additional sensing, is associated/derived/determined based on sidelink DRX configuration for the second UE. The sidelink active time, associated with the partial sensing, is associated/derived/determined based on sidelink DRX configuration for the first UE.

In one embodiment, the sidelink active time, associated with the additional sensing, is associated/derived/determined based on sidelink DRX configuration for the second UE. The sidelink active time, associated with the partial sensing, is associated/derived/determined based on sidelink DRX configuration for the second UE.

In one embodiment, the sidelink active time, associated with the additional sensing, is associated/derived/determined based on sidelink DRX configuration for the first UE. The sidelink active time, associated with the partial sensing, is associated/derived/determined based on sidelink DRX configuration for the first UE.

Preferably in certain embodiments, the first UE may have/maintain/establish a sidelink link/connection with a sidelink group on PC5 interface, wherein the sidelink group comprises at least the first UE and the second UE. Preferably in certain embodiments, the sidelink DRX is performed/operated for sidelink communication of the sidelink group. Preferably in certain embodiments, the sidelink DRX configuration is configured for the sidelink group. Preferably in certain embodiments, the sidelink DRX configuration is configured for the first UE.

Preferably in certain embodiments, the sidelink active time, associated with the additional sensing, is associated/derived/determined based on sidelink DRX configuration for the sidelink group. Preferably or alternatively in certain embodiments, the sidelink active time, associated with the additional sensing, is associated/derived/determined based on sidelink DRX configuration for the first UE.

Preferably in certain embodiments, the sidelink active time, associated with the partial sensing, is associated/ derived/determined based on sidelink DRX configuration for the sidelink group. Preferably or alternatively in certain embodiments, the sidelink active time, associated with the partial sensing, is associated/derived/determined based on sidelink DRX configuration for the first UE.

In one embodiment, the sidelink active time, associated with the additional sensing, is associated/derived/determined based on sidelink DRX configuration for the sidelink group. Preferably in certain embodiments, the sidelink active time, associated with the partial sensing, is associated/derived/determined based on sidelink DRX configuration for the sidelink group.

In one embodiment, the sidelink active time, associated with the additional sensing, is associated/derived/determined based on sidelink DRX configuration for the sidelink group. Preferably in certain embodiments, the sidelink active time, associated with the partial sensing, is associated/derived/determined based on sidelink DRX configuration for the first UE.

Preferably in certain embodiments, the first UE may determine/derive the resource selection window based on sidelink active time of the second UE—e.g., the resource selection window is (restricted/limited) within the sidelink active time of the second UE. Preferably in certain embodiments, the first UE may determine/derive the resource selection window based on sidelink DRX configuration for the second UE. Preferably or alternatively in certain embodiments, the first UE may determine/derive the resource selection window based on sidelink DRX configuration for the first UE. Preferably or alternatively in certain embodiments, the first UE may determine/derive the resource selection window based on sidelink DRX configuration for the sidelink link/connection between the first UE and the second UE. Preferably or alternatively in certain embodiments, the first UE may determine/derive the resource selection window based on sidelink DRX configuration for the sidelink group.

Preferably in certain embodiments, the first UE may have/maintain/establish multiple sidelink links/connections on PC5 interface. For different sidelink links/connections, the first UE may perform sidelink transmission/reception to/from different paired UEs.

Preferably in certain embodiments, the first UE may have/maintain/establish a first sidelink link/connection and a second sidelink link/connection. The paired UEs of the first sidelink link/connection may be different from the paired UEs of the second sidelink link/connection. Preferably in certain embodiments, the one or more sidelink logical channels associated with (the paired UEs of) the first sidelink link/connection are separate/independent from the one or more sidelink logical channels associated with (the paired UEs of) the second sidelink link/connection.

Preferably in certain embodiments, the data packet is associated with at least a sidelink logical channel Preferably in certain embodiments, the sidelink data comes from at least a sidelink logical channel.

Preferably in certain embodiments, the sidelink data transmission may be/mean PSSCH transmission.

Preferably in certain embodiments, the sidelink control transmission may be/mean PSCCH transmission.

Preferably in certain embodiments, the SCI may be delivered at least in PSCCH. Preferably in certain embodiments, the sidelink control information may comprise 1st stage SCI. Preferably in certain embodiments, the 1st stage SCI may be transmitted via PSCCH. Preferably in certain embodiments, the sidelink control information may comprise 2nd stage SCI. Preferably in certain embodiments, the 2nd stage SCI may be transmitted via multiplexed with PSSCH. Preferably in certain embodiments, the SCI format 1 is 1st stage SCI. Preferably in certain embodiments, the SCI format 2-A is a 2nd stage SCI. Preferably in certain embodiments, the SCI format 2-B is a 2nd stage SCI.

Preferably in certain embodiments, the sidelink slot may mean slot for sidelink. Preferably in certain embodiments, a sidelink slot may be represented as a TTI. Preferably in certain embodiments, a TTI may be a subframe (for sidelink). Preferably in certain embodiments, a TTI comprises multiple symbols, e.g., 12 or 14 symbols. Preferably in certain embodiments, the TTI may be a slot (fully/partially) comprising sidelink symbols. Preferably in certain embodiments, the TTI may mean a transmission time interval for a sidelink (data) transmission. Preferably in certain embodiments, a sidelink slot or a slot for sidelink may contain all OFDM symbols available for sidelink transmission. Preferably in certain embodiments, a sidelink slot or a slot for sidelink may contain a consecutive number symbols available for sidelink transmission. Preferably in certain embodiments, a sidelink slot or a slot for sidelink means that a slot is included in a sidelink resource pool.

Preferably in certain embodiments, the symbol may mean a symbol indicated/configured for sidelink.

Preferably in certain embodiments, a sub-channel is a unit for sidelink resource allocation/scheduling (for PSSCH). Preferably in certain embodiments, a sub-channel may comprise multiple contiguous Physical Resource Blocks (PRBs) in frequency domain. Preferably in certain embodiments, the number of PRBs for each sub-channel may be (pre-)configured for a sidelink resource pool. Preferably in certain embodiments, a sidelink resource pool (pre-)configuration may indicate/configure the number of PRBs for each sub-channel Preferably in certain embodiments, the number of PRBs for each sub-channel may be any of 4, 5, 6, 8, 9, 10, 12, 15, 16, 18, 20, 25, 30, 48, 50, 72, 75, 96, 100. Preferably in certain embodiments, a sub-channel may be represented as a unit for sidelink resource allocation/scheduling. Preferably in certain embodiments, a sub-channel may mean a PRB. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the UE may be/mean/comprise/replace a device.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be V2X transmission/reception. Preferably in certain embodiments, the sidelink transmission/reception may be Pedestrian-to-Everything (P2X) transmission/reception. Preferably in certain embodiments, the sidelink transmission/reception may be on PC5 interface.

Preferably in certain embodiments, the PC5 interface may be wireless interface for communication between device and device. Preferably in certain embodiments, the PC5 interface may be wireless interface for communication between devices. Preferably in certain embodiments, the PC5 interface may be wireless interface for communication between UEs. Preferably in certain embodiments, the PC5 interface may be wireless interface for V2X or P2X communication. Preferably in certain embodiments, the Uu interface may be wireless interface for communication between network node and device. Preferably in certain embodiments, the Uu interface may be wireless interface for communication between network node and UE.

Preferably in certain embodiments, the first UE may be a first device. Preferably in certain embodiments, the first device may be a vehicle UE. Preferably in certain embodiments, the first device may be a V2X UE.

Preferably in certain embodiments, the second UE may be a second device. Preferably in certain embodiments, the second device may be a vehicle UE. Preferably in certain embodiments, the second device may be a V2X UE.

Preferably in certain embodiments, the first UE and the second device are different devices.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device for partial sensing in a sidelink resource pool, comprising:
   triggering to perform resource selection for a sidelink data at a timing, wherein the first device receives or monitors sidelink control information for a contiguous time duration before the timing;
   determining or selecting a first sidelink resource from a set of sidelink resources, wherein the set of sidelink resources is derived or determined based on at least sensing results of a specific number of Transmission Time Intervals (TTIs), wherein the specific number of TTIs comprises TTIs in a contiguous sensing duration after the timing and all or a latter part of contiguous TTIs in the contiguous time duration before the timing; and
   performing a first sidelink transmission on the first sidelink resource for transmitting the sidelink data to a second device.

2. The method of claim 1, wherein the set of sidelink resources is derived or determined based on sensing results of the TTIs in the contiguous sensing duration after the timing and receiving/monitoring results of the all or the latter part of contiguous TTIs in the contiguous time duration before the timing, and/or the sensing results of the all or the latter part of the contiguous TTIs in the contiguous time duration means the receiving/monitoring results of the all or the latter part of the contiguous TTIs in the contiguous time duration.

3. The method of claim 1, wherein:
   summation of a first number of TTIs of the contiguous sensing duration and a second number of the all or the latter part of the contiguous TTIs in the contiguous time duration is equal to a value of the specific number, and/or
   a time length of the contiguous sensing duration is determined or derived based on the value of the specific number and a time length of the all or the latter part of the contiguous TTIs in the contiguous time duration, and/or
   the time length of the contiguous sensing duration is the same as the value of the specific number minus the time length of the all or the latter part of the contiguous TTIs in the contiguous time duration.

4. The method of claim 3, wherein:
   if time length of the contiguous time duration is less than the value of the specific number, the first device performs the partial sensing for the contiguous sensing duration after the timing, and/or
   if time length of the contiguous time duration is larger than the value of the specific number, the first device does not perform the partial sensing after the timing for the sidelink data.

5. The method of claim 1, wherein:
   a value of the specific number is 31, 32, (pre-)configured or specified, and/or
   the value of the specific number is determined based on a data priority of the sidelink data, and/or
   the value of the specific number is determined based on a latency requirement or remaining packet delay budget of the sidelink data, and/or
   the value of the specific number is determined based on a Channel Busy Ratio (CBR) of the sidelink resource pool, and/or
   the specific number of TTIs is in a unit of sidelink TTI.

6. The method of claim 1, wherein:
   the timing is in a sidelink on-duration active time of at least one sidelink Discontinuous Reception (DRX) cycle, and/or
   the contiguous time duration is in the sidelink on-duration active time, and/or
   the contiguous time duration starts in a starting boundary or timing of the sidelink on-duration active time, and/or
   the contiguous time duration ends during the timing or at a beginning of the timing, or the contiguous time duration is immediately before the timing, and/or
   the contiguous sensing duration starts during the timing or at an ending of the timing, or the contiguous sensing duration is immediately after the timing, and/or
   performing the partial sensing for the contiguous sensing duration is in response to the triggering to perform resource selection for the sidelink data.

7. The method of claim 1, wherein:
   the TTI means sidelink TTI or sidelink slot in the sidelink resource pool, and/or
   the timing is in a sidelink TTI in the sidelink resource pool, and/or
   the contiguous time duration consists of sidelink TTIs in the sidelink resource pool, and/or
   the contiguous sensing duration comprises sidelink TTIs in the sidelink resource pool.

8. A first device configured for partial sensing in a sidelink resource pool, comprising:
   a memory; and
   a processor operatively coupled to the memory, wherein the processor is configured to execute program code to:
      trigger to perform resource selection for a sidelink data at a timing, wherein the first device receives or monitors sidelink control information for a contiguous time duration before the timing;
      determine or select a first sidelink resource from a set of sidelink resources, wherein the set of sidelink resources is derived or determined based on at least sensing results of a specific number of Transmission Time Intervals (TTIs), wherein the specific number of TTIs comprises TTIs in a contiguous sensing duration after the timing and all or a latter part of contiguous TTIs in the contiguous time duration before the timing; and
      perform a first sidelink transmission on the first sidelink resource for transmitting the sidelink data to a second device.

9. The first device of claim 8, wherein the set of sidelink resources is derived or determined based on sensing results of the TTIs in the contiguous sensing duration after the timing and receiving/monitoring results of the all or the latter part of contiguous TTIs in the contiguous time duration before the timing, and/or the sensing results of the all or the latter part of the contiguous TTIs in the contiguous time duration means the receiving/monitoring results of the all or the latter part of the contiguous TTIs in the contiguous time duration.

10. The first device of claim 8, wherein:
   summation of a first number of TTIs of the contiguous sensing duration and a second number of the all or the latter part of the contiguous TTIs in the contiguous time duration is equal to a value of the specific number, and/or
   a time length of the contiguous sensing duration is determined or derived based on the value of the specific number and a time length of the all or the latter part of the contiguous TTIs in the contiguous time duration, and/or the time length of the contiguous sensing duration is the same as the value of the specific number minus the time length of the all or the latter part of the contiguous TTIs in the contiguous time duration.

11. The first device of claim 10, wherein:

if time length of the contiguous time duration is less than the value of the specific number, the first device performs the partial sensing for the contiguous sensing duration after the timing, and/or if time length of the contiguous time duration is larger than the value of the specific number, the first device does not perform the sensing after the timing for the sidelink data.

12. The first device of claim 8, wherein:

a value of the specific number is 31, 32, (pre-)configured or specified, and/or the value of the specific number is determined based on a data priority of the sidelink data, and/or the value of the specific number is determined based on a latency requirement or remaining packet delay budget of the sidelink data, and/or the value of the specific number is determined based on a Channel Busy Ratio (CBR) of the sidelink resource pool, and/or the specific number of TTIs is in a unit of sidelink TTI.

13. The first device of claim 8, wherein:

the timing is in a sidelink on-duration active time of at least one sidelink Discontinuous Reception (DRX) cycle, and/or the contiguous time duration is in the sidelink on-duration active time, and/or the contiguous time duration starts in a starting boundary or timing of the sidelink on-duration active time, and/or the contiguous time duration ends during the timing or at a beginning of the timing, or the contiguous time duration is immediately before the timing, and/or the contiguous sensing duration starts during the timing or at an ending of the timing, or the contiguous sensing duration is immediately after the timing, and/or performing the partial sensing for the contiguous sensing duration is in response to the triggering to perform resource selection for the sidelink data.

14. The first device of claim 8, wherein:

the TTI means sidelink TTI or sidelink slot in the sidelink resource pool, and/or the timing is in a sidelink TTI in the sidelink resource pool, and/or the contiguous time duration consists of sidelink TTIs in the sidelink resource pool, and/or the contiguous sensing duration comprises sidelink TTIs in the sidelink resource pool.

15. The method of claim 1, wherein:

the first device does not perform full sensing for transmitting the sidelink data to the second device.

16. The method of claim 1, wherein:

the contiguous sensing duration ends before a first candidate slot associated with partial sensing.

17. The method of claim 1, wherein:

the partial sensing for the contiguous sensing duration means or comprises contiguous sensing, and/or the partial sensing for the contiguous sensing duration means or comprises neither periodic-based partial sensing nor sensing based on reservation periods.

18. The first device of claim 8, wherein:

the first device does not perform full sensing for transmitting the sidelink data to the second device.

19. The first device of claim 8, wherein:

the contiguous sensing duration ends before a first candidate slot associated with partial sensing.

20. The first device of claim 8, wherein:

the partial sensing for the contiguous sensing duration means or comprises contiguous sensing, and/or the partial sensing for the contiguous sensing duration means or comprises neither periodic-based partial sensing nor sensing based on reservation periods.

* * * * *